(12) United States Patent
Dangi et al.

(10) Patent No.: US 12,386,409 B2
(45) Date of Patent: Aug. 12, 2025

(54) POWER-AWARE SCHEDULING IN DATA CENTERS

(71) Applicant: NVIDIA Corporation, Santa Clara, CA (US)

(72) Inventors: Yogesh Dangi, Pune (IN); Manas Ranjan Jagadev, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/516,899

(22) Filed: Nov. 21, 2023

(65) Prior Publication Data

US 2025/0165052 A1    May 22, 2025

(51) Int. Cl.
*G06F 1/3228* (2019.01)

(52) U.S. Cl.
CPC .................. *G06F 1/3228* (2013.01)

(58) Field of Classification Search
CPC ........ G06N 20/00; G06N 7/01; G06F 1/3203; G06F 1/3209; G06F 9/4893; G06F 9/5094; G06F 1/3206; G06F 1/3228; G06F 1/324; G06F 2009/4557; G06F 9/45558; G06F 9/4881; G06F 9/50; G06F 9/5038; G06F 9/505; G06F 1/189; G06F 1/20; G06F 1/206; G06F 1/26; G06F 1/28; G06F 1/3265; G06F 1/3287; G06F 1/329; G06F 13/409; G06F 17/18; G06F 18/214; G06F 2009/45562; G06F 9/5005; G06F 9/5011; G06F 9/5016; G06F 9/5022; G06F 9/5027; G06F 9/5033; G06F 9/5044; G06F 9/5061; G06F 9/5072; G06F 9/5083; G06F 9/5088; G06F 9/522; G06F 9/542; G06F 9/546
See application file for complete search history.

(56) References Cited

U.S. PATENT DOCUMENTS

| | | | |
|---|---|---|---|
| 2011/0239010 A1* | 9/2011 | Jain ....................... | G06F 1/3209 713/310 |
| 2012/0054527 A1* | 3/2012 | Pfeifer .................... | G06F 1/266 713/340 |
| 2016/0054781 A1* | 2/2016 | Rajappa ................ | H04L 47/821 713/320 |
| 2017/0324813 A1* | 11/2017 | Jain ........................ | G06F 9/5016 |
| 2021/0034436 A1* | 2/2021 | Tian ..................... | G06F 9/45558 |

* cited by examiner

*Primary Examiner* — Terrell S Johnson
(74) *Attorney, Agent, or Firm* — Lowenstein Sandler LLP

(57) ABSTRACT

A computing device determines an expected power consumption value for a set of processes. The computing device further determines an available rack power capacity for one or more server racks amongst multiple server racks, and selects a first server rack having a highest available rack power capacity. The first server rack includes a first set of servers, and the computing device further determines whether a first server of the first set of servers is available. Responsive to determining the first server is available, the computing devices assigns the set of processes to the first server.

20 Claims, 12 Drawing Sheets

POWER-AWARE SCHEDULING IN DATA CENTERS

TECHNICAL FIELD

At least one embodiment pertains to data center process scheduling. For example, at least one embodiment pertains to processors or computing systems used to schedule processes on servers across server racks of a data center.

BACKGROUND

In multi-computing platforms and environments—such as data centers, supercomputers, high-performance computing (HPC) environments, cluster computing environments, or cloud computing environments, etc.—it is important to find idle or underutilized computing devices so that the usages of these computing devices can be more efficiently allocated by taking corrective actions. In the data center or cloud environment, it is important to efficiently use the electrical power provided to a server. When power is not being used, a data center may be underutilizing the computing resources of servers in the data center.

BRIEF DESCRIPTION OF DRAWINGS

Various embodiments in accordance with the present disclosure will be described with reference to the drawings, in which.

DETAILED DESCRIPTION

Figure 1A:
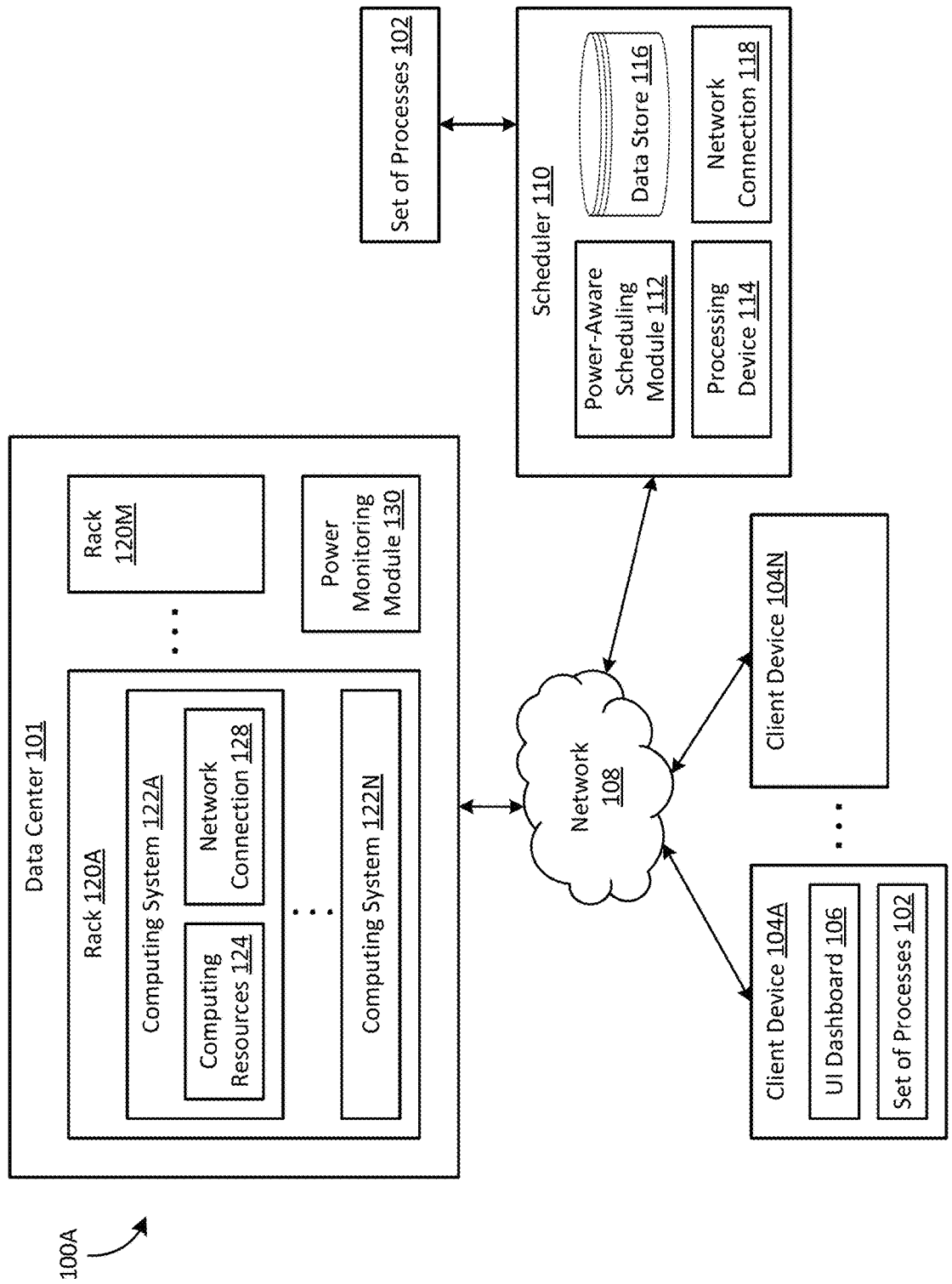
FIG. 1A is a block diagram of a data center environment for implementing power-aware scheduling, according to aspects of the disclosure.

Embodiments described herein are directed to optimizing data center power usage with power-aware scheduling. A data center can include multiple computing devices. The computing devices can include central processing units (CPUs), graphics processing units (GPUs), data processing units (DPUs), or the like These computing devices can also be implemented as components in devices referred to as machines, computers, servers, network devices, or the like. These computing devices are important resources in a data center or cloud environment. It is important to have efficient operation of resources in the data center, which can be based on power consumption and/or efficiency of computing devices in the data center. Optimizing available power (electrical energy) consumed by computing devices like servers, is a priority in the data center environment. For example, many data centers have a growing interest in reducing the carbon footprint of the data center, while maintaining mission-critical reliability. In some systems, computing devices can run with a certain fixed power overhead, such that surges in power usage do not cause the computing device (or group of computing devices, such as servers in a server rack) to exceed the electrical power provided to the computing device or group of computing devices. In some systems, the fixed overhead can be large, which can cause computing devices to be underutilized, resulting in a lower efficiency of the data center. In some systems, scheduling jobs can be based on peak power usages by servers which can cause the overhead to be large.

Aspects and embodiments of the present disclosure address these and other challenges by providing a power-aware scheduler for scheduling a set of processes (e.g., applications, jobs, tasks, or routines) received at the data center. By scheduling the set of processes based on an expected power consumption value (e.g., a mean, median, or mode power consumption value for the set of processes), the fixed overhead can be reduced without reducing mission-critical reliability. Additionally, sets of processes can be scheduled based on server rack power to optimize the power usage of a server rack, and not solely scheduled based on optimizing the power usage of individual servers. This can be achieved by causing the power-aware scheduler (e.g., a power-aware scheduling module of a scheduler) to schedule a set of processes on a server of a server rack with the largest available power capacity (e.g., the server with the most electrical power headroom). Additional details regarding determining the largest available power capacity for a server rack (e.g., largest available rack power capacity) are described below with reference to FIGS. 2-3. By scheduling a set of processes on server racks with the most available power, the scheduler can avoid exceeding the peak power usages of the server rack (e.g., the maximum power values associated with the rack).

Advantages of the disclosure include, but are not limited to, an increased electrical power efficiency for data centers.

FIG. 1A is a block diagram of a data center environment 100A for implementing power-aware scheduling, according to aspects of the disclosure. The data center environment 100A includes a data center 101, set of processes 102, scheduler 110, and client devices 104A-N connected by a network 108. As described above, the set of processes 102 can include one or more applications, jobs, tasks, routines, or the like.

In at least one embodiment, the data center 101 can include one or more racks 120A-N and a power monitoring module 130. Each rack 120 can include one or more multiple computing systems 122A-N (herein also referred to as "computing system 122"), where the quantity of racks (M) is a positive integer equal to or greater than zero, and the quantity of computing systems (N) is a second positive integer equal to or greater than zero. In at least one embodiment, each rack 120 can have the same quantity (N) of computing systems 122A-N. That is, in a data center 101, the quantity of computing systems 122A-N can be determined with the equation, X=M*N, where X is the quantity of computing system 122A-N in the data center 101, M is the quantity of racks 120A-M, and N is the quantity of computing systems 122A-N on each rack 120A-M. In at least one embodiment, data center 101 can refer to a physical location. In at least one embodiment, data center 101 can refer to a logical collection of racks 120A-M. In at least one embodiment, data center 101 can include additional components, such as network access components, data center services components, etc. In at least one embodiment, network access and/or data center service components can be included in one or more racks 120A-M and/or one or more computing systems 122A-N of the data center 101.

In at least one embodiment, network 108 can include a public network (e.g., the internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

In at least one embodiment, client devices 104A-N can include a UI dashboard 106. In at least one embodiment, client devices 104A-N can generate a set of processes 102 to be received at the scheduler 110 and scheduled on at data center 101 by power-aware scheduling module 112. In at least one embodiment, client devices 104A-N can be used to monitor or configure settings of the data center environment 100A (e.g., through UI dashboard 106). Client devices 104A-N can allow users with enhanced privileges with respect to resources of the data center environment 100A access to components of the data center environment 100A (e.g., administrator accounts, etc.). In at least one embodiment, the client devices 104A-N can be used to receive a set of processes 102 from a coupled computing device (e.g., a user device) and forward the set of processes 102 to the scheduler 110. In at least one embodiment, the client devices 104A-N can refer to user devices that generates the request including the set of processes that is received at the scheduler 110.

In at least one embodiment, scheduler 110 includes power-aware scheduling module 112, processing device 114, data store 116, and network connection 118. The scheduler 110 includes a processing device 114 that can assign a set of processes to a rack 120 and/or computing system 122 of a rack 120 based on a power consumption value for the set of processes, as determined by the power-aware scheduling module 112. In at least one embodiment, the power consumption value for the set of processes can be predicted by a model, such as a machine learning (ML) model. In at least one embodiment, the ML model can be a random forest regression model. In at least one embodiment, the ML model can be a support vector machine (SVM) model. In at least one embodiment, the ML model can be other types of ML models that can characterize a power consumption value for a given set of processes. In at least one embodiment, the ML model can be trained using historical power consumption values for sets of processes. That is, a set of processes can be assigned an identification value which can correlate to identification values of previously performed similar sets of processes. In at least one embodiment, the power consumption value can be estimated based on factors associated with the set of processes, such as conditions present in the data center 101, the rack 120, and/or the computing system 122. For example, in at least one embodiment, the set of processes can be received at the power-aware scheduling module 112 along with an estimated power consumption for the set of processes. That is, in at least one embodiment, a system-wide requirement can be imposed to users of client devices 104A-N (herein also referred to as "client device 104") that requires a power consumption value for the set of processes be submitted alongside the set of processes.

In at least one embodiment, the power-aware scheduling module 112 can be coupled to one or more racks 120A-M and/or one or more computing systems 122A-N in the data center 101. Each computing system 122 can include computing resources 124, such as a CPU, a GPU, a DPU, volatile memory and/or nonvolatile memory. Each computing system 122 can include a network connection 128 to communicate with other devices in the data center 101 and/or other devices over the network 108. In at least one embodiment, the power-aware scheduling module 112 can be included in the data center 101 (e.g., physically housed in a shared physical location). The power-aware scheduling module 112 can be implemented in one of the computing systems 122, or as a standalone computing system in the data center 101. Alternatively, in at least one embodiment, the power-aware scheduling module 112 can be external to the data center 101 (e.g., physically housed in a separate location, such as another data center 101 (not illustrated)). In at least one embodiment, the power-aware scheduling module 112 can schedule sets of processes to be performed across multiple data centers 101 (not illustrated). In at least one embodiment, the scheduler can have one or more critical backup systems (e.g., backup schedulers) which can be configured to perform the functions of power-aware scheduling module 112 if there is an interruption in services from power-aware scheduling module 112.

In at least one embodiment, the power-aware scheduling module 112 can determine a set of features about a set of processes 102 received at the scheduler 110. For example, and in at least one embodiment the set of features can include the power consumption value associated with a given set of processes and can retrieve a real-time power usage value of a rack 120 and/or computing system 122 (using power monitoring module 130). Additional details regarding retrieving real-time power usage values is described below with reference to FIGS. 1B-C. The power-aware scheduling module 112 can identify the rack 120 with the highest available rack power capacity by subtracting the real-time power usage of the rack from a maximum power value of the rack. For example, if a rack can support 10 kilowatts (e.g., has a maximum rack power value of 10 KW), and the real-time power usage of the rack is 6 KW, then the maximum power value of the rack would be 10 KW-6 KW, or 4 KW. In at least one embodiment, the power-aware scheduling module 112 can collect and store (e.g., in data store 116) or receive these power usage and power consumption values as a table of values. An example table including illustrative entries, Table 1 is illustrated below:

TABLE 1

| Rack Identifier | Rack Power Capacity | Actual Rack Power Usage (Real-Time) | Available Rack Power (Capacity − Usage) | Percentage of Rack Power Used |
|---|---|---|---|---|
| Rack(a) | 8 KW | 2 KW | 6 KW | 25% |
| Rack(b) | 8 KW | 4 KW | 4 KW | 50% |
| . . . | . . . | . . . | . . . | . . . |
| Rack(M) | 8 KW | 6 KW | 2 KW | 75% |

In at least one embodiment, the power-aware scheduling module 112 can collect power consumption values for given sets of processes over time, and store collected values in data store 116. In at least one embodiment, power consumption values can be estimated for a given set of processes based on values of entries in data store 116. Using a processing device (such as processing device 114) the power-aware scheduling module 112 can estimate a power consumption value for a given set of processes and cause the scheduler 110 to schedule the set of processes on a rack 120 having a highest available rack power capacity. In at least one embodiment, the power-aware scheduling module 112 can send a notification to a user interface (UI) dashboard such as UI dashboard 106 of a client device 104 to indicate when a set of processes have been assigned to a computing system 122. In at least one embodiment, the power-aware scheduling module 112 can send a notification to the UI dashboard when the set of processes have been performed. In at least one embodiment, the power-aware scheduling module 112 can send a notification to the UI dashboard 106 indicating the computing system 122A-N to which a given set of processes have been assigned.

Data store 116 can be a persistent storage that is capable of storing scheduling information. Scheduling information can include information pertaining to the set of processes 102 such as expected power consumption values, estimated power consumption values, actual power consumption values, historical power consumption values, computing resource utilization requirements (e.g., hardware component utilization metrics), duration information, etc. Scheduling information can include information pertaining to the data center 101, such as available rack power capacities, available sever power capacities, real-time rack power usage values, real-time server power usage values, maximum available rack power values, maximum available server power values, etc. Scheduling information can include data structures to tag, organize, and index the scheduling information. Data store 116 can be hosted by one or more storage devices, such as main memory, magnetic or optical storage based disks, tapes or hard drives, network-attached storage (NAS), storage area network (SAN), and so forth. In at least one embodiment, data store 116 can be a network-attached file server, while in other embodiments the data store 116 can be another type of persistent storage such as an object-oriented database, a relational database, and so forth, that can be a separate component of data center environment 100A, or one or more different machines within the data center environment 100A (e.g., such as in data center 101).

In at least one embodiment, the data center environment 100A can include a system with a memory device and a processing device operatively coupled to the memory device. The computing device can include a set of processing units. The computing device can determine an expected power consumption value for a set of processes. The computing device can determine for racks 120A-N, an available rack power capacity. The computing device can select from racks 120A-N, a rack 120 having a highest available rack power capacity. The computing device can determine whether a server of the rack 120 is available. Responsive to determining a server of the rack 120 is available, the computing device can assign the set of processes to the server of the rack 120. In at least one embodiment, the system includes one or more of a control system for an autonomous or semi-autonomous machine; a perception system for an autonomous or semi-autonomous machine; a system for performing simulation operations; a system for performing deep learning operations; a system for generating synthetic data; a system for generating multi-dimensional assets using a collaborative content platform; a system implemented using an edge device; a system implemented using a robot; a system incorporating one or more virtual machines (VMs); a system implemented at least partially in a data center; or a system implemented at least partially using cloud computing resources.

In at least one embodiment, the power-aware scheduling module 112 can collect and store historical power consumption values associated with multiple sets of processes in data store 116 to train a ML model to predict a power consumption value for a newly received set of processes. The ML model can identify various hidden patterns in the historical power consumption values for respective sets of processes and use a current pattern in newly collected data to determine the power consumption value for the newly received set of processes. In at least one embodiment, the ML model can be one or more of a logistics regression model, a k-nearest neighbor model, a random forest regression model, a gradient boost model, or an Extreme Gradient Boost (XGBoost) model. Alternatively, other types of ML models can be used. The trained ML model can be deployed as an object to a component of data center environment 100A (e.g., such as scheduler 110 or power-aware scheduling module 112).

Figure 1B:
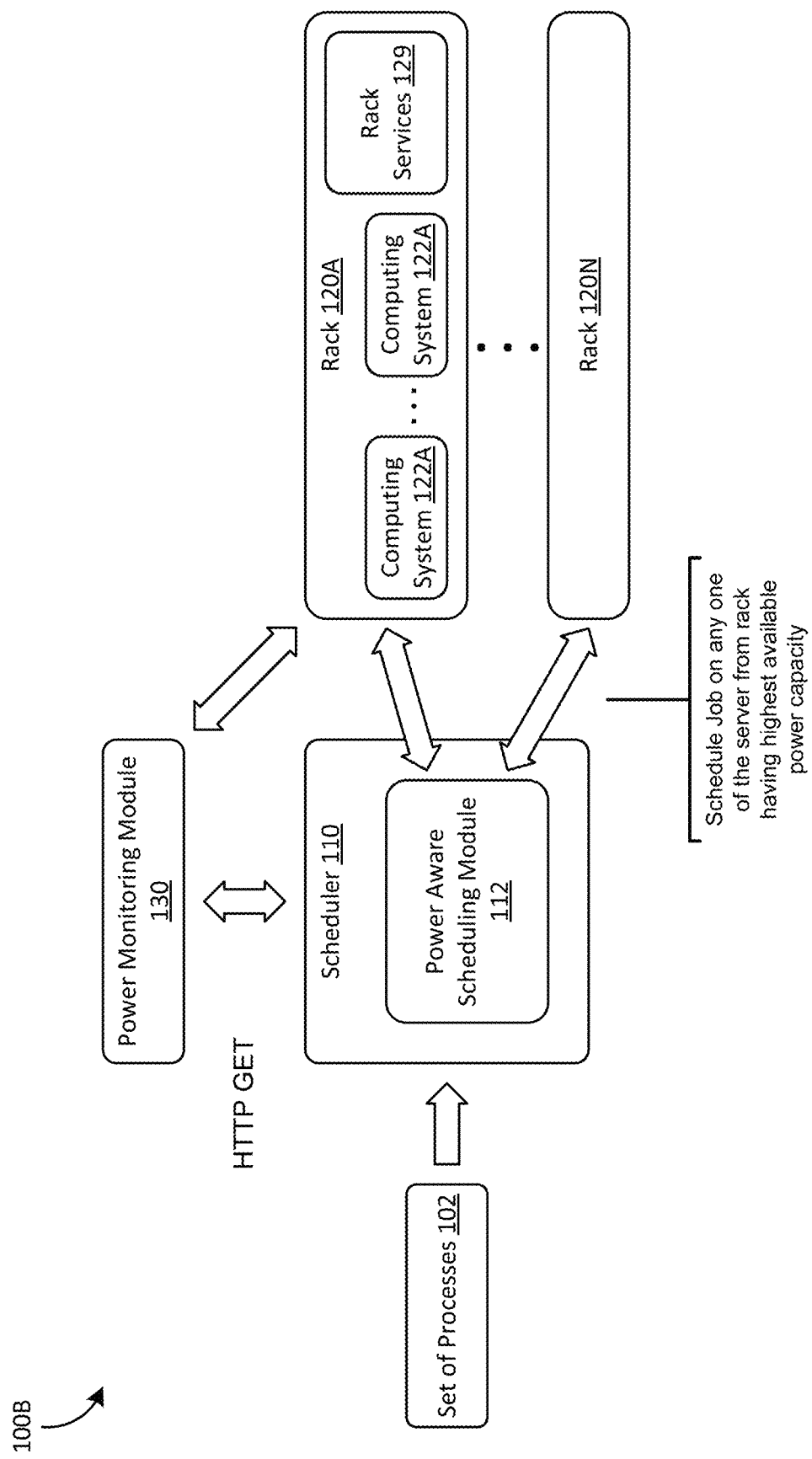
FIG. 1B is a block diagram of a data center environment for implementing power-aware scheduling, according to aspects of the disclosure.

FIG. 1B is a block diagram of a data center environment 100B for implementing power-aware scheduling, according to aspects of the disclosure. The data center environment 100B includes a set of processes 102, the scheduler 110, the power monitoring module 130, and racks 120A-N. For clarity and brevity, not every component of data center environment 100A is shown and/or described with reference to FIG. 1B. However, it can be appreciated that FIG. 1B includes relevant portions of FIG. 1A, and that insofar as various elements or components are illustrated or described, each component of FIG. 1B retains the same, or a similar structure to the respectively named and numbered component of FIG. 1A. That is, for example, scheduler 110 as illustrated in FIG. 1B can be the same as, or similar to (e.g., perform the functions of) scheduler 110 as illustrated in FIG. 1A.

A set of processes 102 can be received at scheduler 110. Power-aware scheduling module 112 can determine a power consumption value for the set of processes, and using the power consumption value for the set of processes 102 and respective maximum power capacities for racks 120A-N, assign the set of processes 102 to a computing system 122 of a rack 120. In at least one embodiment, the power-aware scheduling module 112 can obtain maximum power capacities for racks 120A-N from power monitoring module 130. In at least one embodiment, the power-aware scheduling module 112 can communicate with the power monitoring module 130 using a HyperText Transfer Protocol (HTTP) Get function. In at least one embodiment, the power-aware scheduling module 112 can assign the set of processes 102 to a rack 120. In at least one embodiment, power-aware scheduling module 112 can schedule a set of processes (e.g., a "job") on any computing system 122A-N (e.g., "server") of a rack 120 having the highest available rack power capacity.

In at least one embodiment, rack services 129 can be implemented on a computing system 122 of rack 120, or as a separate computing device. In at least one embodiment, rack services 129 can include a hardware component that can collect real-time power usage values for a rack 120 and/or computing systems 122A-N of a rack 120. By way of non-limiting example, in at least one embodiment, the rack services can be implemented as a service, an agent, or a process within the OS or outside the OS in the kernel space of a processing device in a rack 120, or in scheduler 110 (e.g., such as processing device 114). In at least one embodiment, rack services 129 can perform one or more functions at regular intervals (e.g., report real-time power usage values, report real-time hardware usage metrics, etc.). In at least one embodiment, rack services 129 can perform one or more functions when triggered, such as when triggered by a power-aware scheduling module 112 attempting to schedule a set of processes 102 at a rack 120 and/or computing system 122 of a rack 120.

In at least one embodiment, rack services 129 can receive the set of processes 102 and, based on usage metrics associated with computing resources of respective computing systems 122A-N, assign the set of processes 102 to a computing system 122. In at least one embodiment, if rack services 129 is unable to assign the set of processes 102 to a computing system 122A-N, rack services 129 can send the set of processes 102 back to scheduler 110. For example, the set of processes 102 can more computing resources than are available at any single computing system 122A-N, or the power consumption value for the set of processes 102 can exceed a maximum available computing system power capacity.

In at least one embodiment, rack services 129 can be used to collect and/or report power usage values for a rack 120 and/or power usage values for respective computing systems 122A-N of the rack 120. In at least one embodiment, rack services 129 can be used collect and/or report computing resource usage metrics for a rack 120 and/or computing resource usage metrics for respective computing systems 122A-N of the rack 120. Rack services 129 can send power usage values and/or computing resource usage metrics that have been collected for a rack 120 to the power monitoring module 130 and/or the power-aware scheduling module 112 (e.g., to be stored in a data store such as data store 116). In at least one embodiment, rack services 129 can be performed at each rack 120A-M (e.g., as a process on one of computing systems 122A-N). In at least one embodiment, some of the rack services 129 can be performed as a part of a standalone computing system within the data center environment 100B. In at least one embodiment, some of the rack services 129 can be performed by the power-aware scheduling module 112 or the scheduler 110. In at least one embodiment, some of the rack services 129 can be performed by the power monitoring module 130.

Figure 1C:
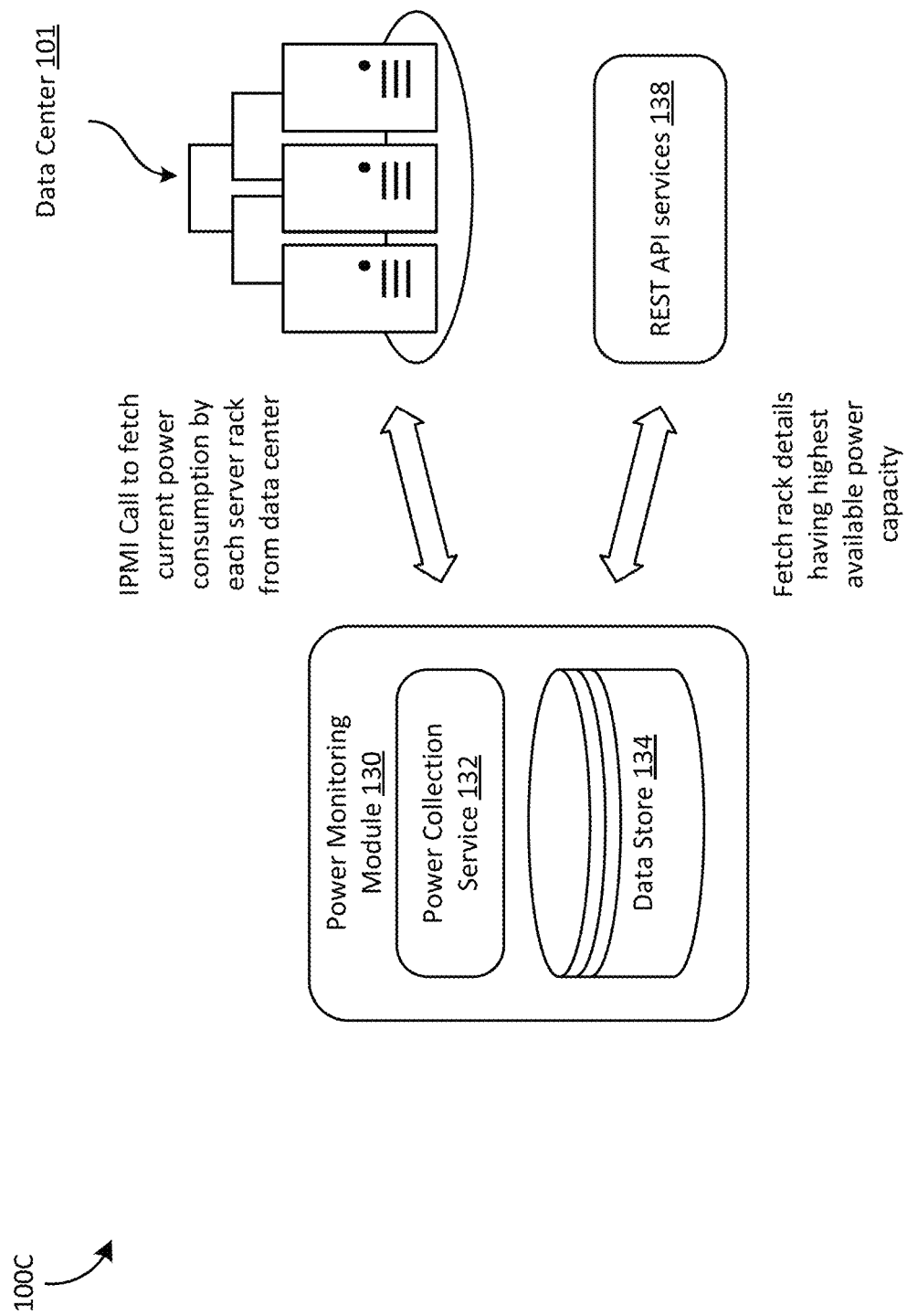
FIG. 1C is a block diagram of a data center environment for implementing power-aware scheduling, according to aspects of the disclosure.

FIG. 1C is a block diagram of a data center environment 100C for implementing power-aware scheduling, according to aspects of the disclosure. The data center environment 100C includes data center 101, power monitoring module 130, and representational state transfer (REST) application programming interface (API) services, such as REST API services 138. A REST API (also known as RESTful API) is an API or web interface that allows interaction with RESTful web services. In at least one embodiment, the REST API services 138 can be exposed to users (e.g., administrators of the data center 101), where the user can pass feature attributes for a specified period (e.g., an hour/day) as input. The REST API services 138 can provide indications of power usage values of racks 120A-N, computing systems 122A-N, and/or power consumption values for a set of processes 102. As described above, aggregated data can be collected, and used as inputs to the REST API services 138 to predict a power consumption value for a set of processes 102 received at a power-aware scheduling module 112. In at least one embodiment, information collected, or transmitted using the REST API services 138 can be used to provide a visualization of the data center environment 100C to a UI dashboard, such as UI dashboard 106 of FIG. 1A.

For clarity and brevity, not every component of data center environments 100A and 100B are shown and/or described with reference to FIG. 1C. However, it can be appreciated that FIG. 1C includes relevant portions of FIGS. 1A-B, and that insofar as various elements or components are illustrated or described, each component of FIG. 1C retains the same, or similar structure to the respectively named and numbered component of FIGS. 1A-B. That is, for example, power monitoring module 130 as illustrated in FIG. 1C can be the same as, or similar to (e.g., perform the functions of) power monitoring module 130 as illustrated and described in FIGS. 1A-B.

Power monitoring module 130 can include power collection service 132 and data store 134. Power collection service 132 can collect power usage values from devices and/or components of the data center 101, such as a rack 120, or computing system 122 (not illustrated). In at least one embodiment, power collection service 132 can collect power consumption values associated with given sets of processes, and/or historical sets of processes (e.g., sets of processes that have previously been performed). In at least one embodiment, power collection service 132 can retrieve one or more power usage or power consumption values from the data center using the intelligent platform management interface (IPMI) protocol. For example, power collection service 132 can use an IPMI call to fetch real-time (e.g., "current") power usage values for each computing system 122 (e.g., "server," not illustrated) in the data center 101. Once power collection service 132 has obtained power usage values and/or power consumption values, the collected values can be stored in data store 134. In at least one embodiment, data store 134 can transmit or synchronize the values of stored entries in data store 134 with other data stores in the data center 101 or data center environment 100C (e.g., such as data store 116 as described with respect to FIG. 1A). In an illustrative example, and in at least one embodiment, the following IPMI command and power deliver unit (PDU) command can be used to fetch power information from the servers of each rack:

```
ipmi-dcmi --session-timeout=6000 -D LAN_2_0 -h HOST_IP -u USER_ID -p PASSWORD --get-system-power-statistics
snmpget -v 2c -c public PDU_IP FIXED_SUFFIX_OEM PORT
```

Once real-time power usage values for servers in a data center 101 (e.g., computing systems 122, not illustrated) have been collected, power monitoring module 130 can obtain server details about each respective server using REST API services 138. In at least one embodiment, data store 134 of power monitoring module 130 can store a rack-to-server mapping table, that power collection service 132 can use to identify servers (e.g., computing units 122A-N) of a server rack (e.g., a rack 120). An example table including illustrative entries, Table 2 is illustrated below:

TABLE 2

| Rack Identifier | First Server Address | ... | N-th Server Address |
|---|---|---|---|
| Rack(a) | Server(a)_HOST_IP_(1) | ... | Server(N)_HOST_IP_(1) |
| ... | ... | | ... |
| Rack(M) | Server(a)_HOST_IP_(M) | ... | Server(N)_HOST_IP_(M) |

By way of non-limiting example, and in at least one embodiment, power monitoring module 130 can use an IPMI call to retrieve a set of power usage values for a respective set of racks 120A-N in the data center 101. The IPMI call can return the power usage values for each rack 120 and a rack identifier. The power monitoring module 130 can store power usage values for each server in a rack 120 of a data center as a table of values in data store 134. An example table including illustrative entries, Table 3 is illustrated below:

TABLE 3

| Server Identifier | Server Power Capacity | Actual Server Power Usage (Real Time) | Available Server Power (Capacity − Usage) | Percentage of Server Power Used |
|---|---|---|---|---|
| Server(a) | 300 watts | 200 watts | 100 watts | 67% |
| Server(b) | 300 watts | 210 watts | 90 watts | 70% |
| ... | ... | ... | ... | ... |
| Server(N) | 300 watts | 240 watts | 60 watts | 80% |

Using the rack identifier, the power monitoring module 130 can use the REST API services 138 to retrieve rack information from the identified rack. Rack information can include, for example, a maximum rack power value, a rack location (physically and/or logically) server information, server utilization metrics, server power usage values, etc. In at least one embodiment, the power monitoring module 130 can implement a communication using REST API services 138, which communication is received by another component of data center environment 100C, such as a power-aware scheduling module 112 (not illustrated). In at least one embodiment, power monitoring module 130 can use the REST API services 138 to fetch the rack information of a rack 120 having the highest available rack power capacity of the racks 120A-N (not illustrated). In an illustrative example, and in at least one embodiment, the following pseudo code can be used in the REST API services 138:

```
{
  rack_id:
    {
      {
        "server_ip": "ip_address",
        "hostname": "hostname_of_server",
        "available_cpu": "available_cpu",
```

-continued

```
        "available_memory": "available_memory",
      },
      {
        "server_ip": "ip_address",
        "hostname": "hostname_of_server",
        "available_cpu": "available_cpu",
        "available_memory": "available_memory",
      },
      {
        "server_ip": "ip_address",
        "hostname": "hostname_of_server",
        "available_cpu": "available_cpu",
        "available_memory": "available_memory",
      }
    }
}
```

The power monitoring module 130 can aggregate power consumption and/or power usage values for a specified time period and summarize the usage data in a summary table, which can be stored in a data store, such as data store 116 of FIG. 1A. This data can be collected and stored for racks, and for servers. Such summary tables can be provided by the REST API service 138. Exemplary tables including illustrative entries, Table 4 (rack information) and Table 5 (server information) are illustrated below:

TABLE 4

| Rack Identifier | Real-Time Rack Power Usage | Available Rack Power | Percentage of Rack Power Used | Rack Timestamp |
|---|---|---|---|---|
| Rack(a) | 2 KW | 6 KW | 25% | YYYY-MM-DD 23:59:59 |
| ... | ... | ... | ... | ... |
| Rack(M) | 6 KW | 2 KW | 75% | YYYY-MM-DD 23:59:59 |

TABLE 5

| Server Identifier | Real-Time Server Power Usage | Available Server Power | Percentage of Server Power Used | Server Timestamp |
|---|---|---|---|---|
| Server(a) | 200 watts | 100 watts | 67% | YYYY-MM-DD 23:59:59 |
| ... | ... | ... | ... | ... |
| Server(N) | 240 watts | 60 watts | 80% | YYYY-MM-DD 23:59:59 |

Figure 1D:
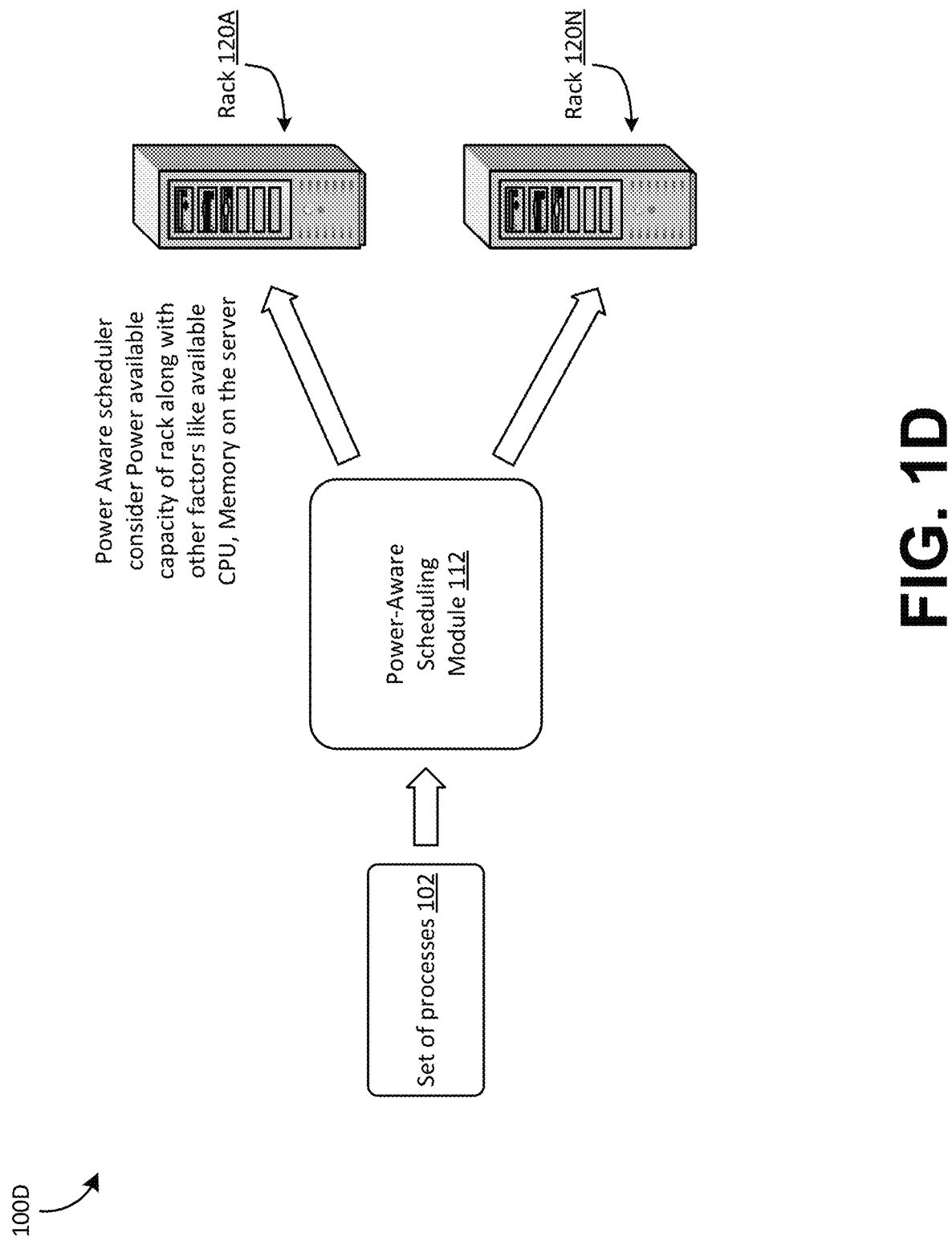
FIG. 1D is a block diagram of a data center environment for implementing power-aware scheduling, according to aspects of the disclosure.

FIG. 1D is a block diagram of a data center environment 100D for implementing power-aware scheduling, according to aspects of the disclosure. The data center environment 100D includes set of processes 102, power-aware scheduling module 112, and racks 120A-N. For clarity and brevity, not every component of data center environments 100A-C are shown and/or described with reference to FIG. 1D. However, it can be appreciated that FIG. 1D includes relevant portions of FIGS. 1A-C, and that insofar as various elements or components are illustrated or described, each component of FIG. 1D retains the same, or similar structure to the respectively named and number component of FIGS. 1A-C. That is, for example, power-aware scheduling module 112 can be the same as or similar to (e.g., perform the functions of) power-aware scheduling module 112 as illustrated and described in FIGS. 1A-C.

The set of processes 102 can be received at the power-aware scheduling module 112. The power-aware scheduling module 112 can assign the set of processes to a rack 120A-M based on various factors, such as a rack maximum power value, the rack real-time power usage, a server maximum power value, a server real-time power usage, and/or available compute resources on a server of a rack 120A-M (e.g., a computing system 122, not illustrated). In at least one embodiment, power-aware scheduling module can directly assign the set of processes 102 to a server of a rack 120. In at least one embodiment, as described with reference to FIG. 1B, the power-aware scheduling module can assign the set of processes 102 to a rack 120, and rack services (e.g., rack services 129, not illustrated) can assign the set of processes 102 to a server (e.g., computing system 122, not illustrated).

In at least one embodiment, the power-aware scheduling module 112 can attempt to identify an available server on a rack 120, such as the rack 120 having the highest available power capacity (as described with reference to FIGS. 1A-C). The power-aware scheduling module 112 can be unable to find an available server on the rack 120. The power-aware scheduling module 112 can then identify (e.g., using power monitoring module 130) another rack 120 with a next-highest available power capacity (e.g., a second-highest available power capacity). In an illustrative example, for a set of three racks 120A-C, rack 120A having 2 KW of available power capacity, rack 120B having 10 KW of available power capacity, and rack 120C having 5 KW of available power capacity, the power-aware scheduling module 112 can first attempt to identify an available server on rack 120B (which has the largest available power capacity). If the power-aware scheduling module 112 is unable to identify an available server on rack 120B, the power-aware scheduling module 112 can next attempt to identify an available server on rack 120C (the rack 120 with the next-largest available power capacity). If the power-aware scheduling module 112 is unable to identify an available server on rack 120C, the power-aware scheduling module 112 can next attempt to identify an available server on rack 120A (the rack 120 with the next-largest available power capacity after rack 120C, i.e., the rack with the third-largest available power capacity for racks 120A-C). In at least one embodiment, upon failing to identify an available server on any of racks 120A-N, power-aware scheduling module 112 can place the set of processes 102 in a waiting queue. In at least one embodiment, upon failing to identify an available server on any of racks 120A-N, the power-aware scheduling module 112 can request an updated real-time power usage value for each of racks 120A-N from the power monitoring module 130 (not illustrated).

Figure 2:
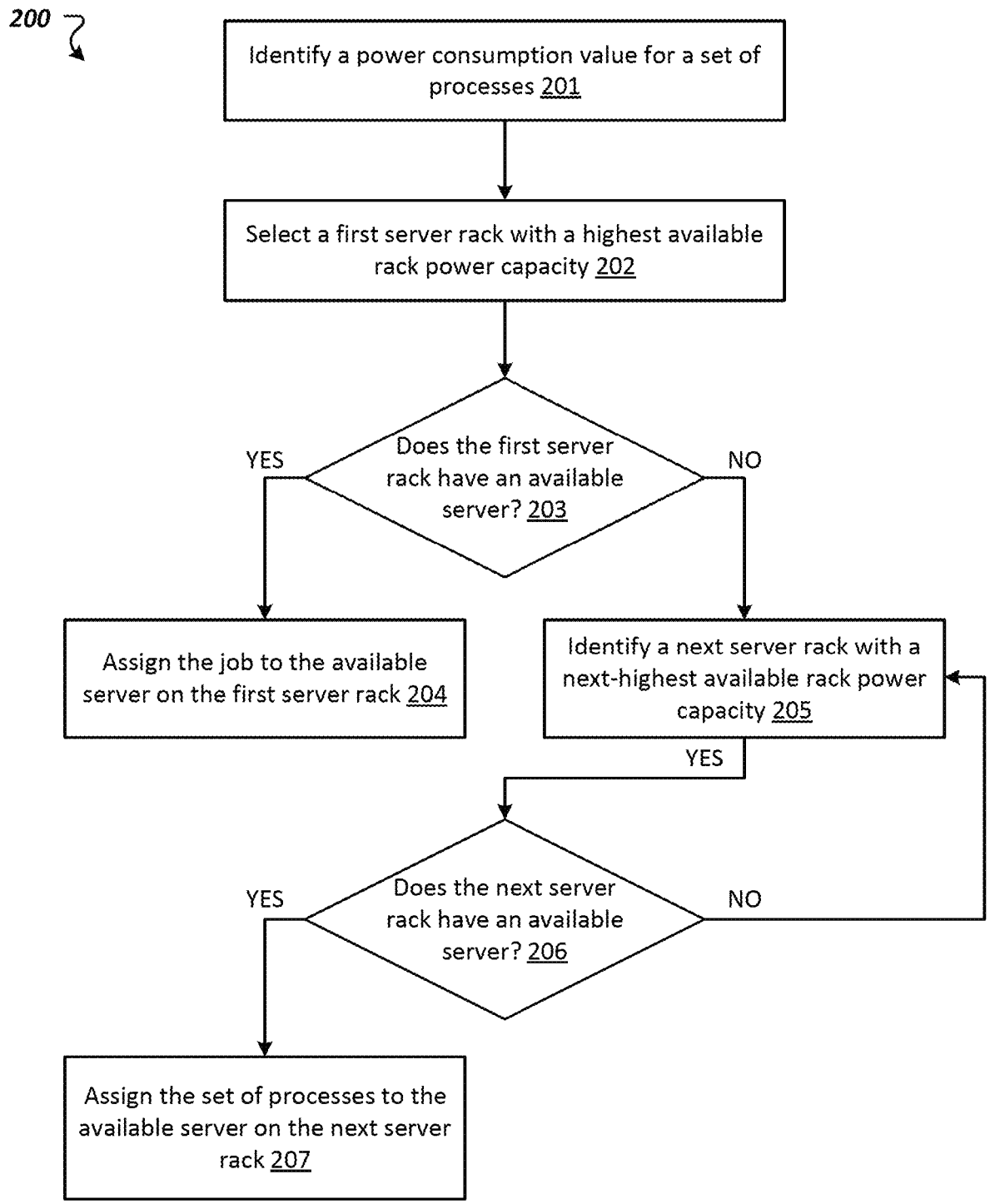
FIG. 2 illustrates a method of power-aware scheduling, according to aspects of the disclosure.

FIG. 2 illustrates a method 200 of power-aware scheduling, according to aspects of the disclosure. Method 200 can be performed by processing logic comprising hardware, software, firmware, or any combination thereof. The processing logic can be implemented in one or more computing devices. In at least one embodiment, method 200 can be performed by power-aware scheduling module 112 of FIGS. 1A-D. In another embodiment, the method 200 can be performed by the processing device 114 of FIG. 1A.

At operation 201, the processing logic begins the method 200 by identifying a power consumption value for a set of processes. The set of processes can include one or more applications, jobs, tasks, routines, or the like. In at least one embodiment, the power consumption value for the set of processes can be determined using metadata included along with the set of processes. For example, and in at least one embodiment, a power consumption value can be included as metadata along with the set of processes when sent to the scheduler (such as the power-aware scheduling module 112 described with reference to FIGS. 1A-D). In at least one embodiment, the power consumption value for the set of processes can be determined based on the estimated compute resources of a server (e.g., a computing system 122 described with reference to FIGS. 1A-D) needed to perform the set of processes. Additional details regarding predicting an expected power consumption value for the set of processes based on compute resources of a server is described with reference to FIG. 4.

In at least one embodiment, the power consumption value for the set of processes can be determined based on historical power consumption values for previous sets of processes, or previous similar sets of processes performed at the data center, such as data center 101 described with reference to FIGS. 1A-D. In at least one embodiment, the power consumption value can be predicted a ML model trained on the historical power consumption values. Additional details regarding predicting an expected power consumption value for the set of processes based on historical power consumption values is described with reference to FIG. 5.

At operation 202, the processing logic selects a first server rack with a highest available rack power capacity. The available rack power capacity can refer to a difference between a real-time power usage value for a given rack and a maximum power value for the rack. For example, referring to Table 1 above, Rack(a) has a rack power capacity of 8 KWs. The real-time power usage of Rack(a) is 2 KWs. Thus, Rack(a) has an available power capacity of 6 KWs. Continuing to refer to Table 1, as illustrated in the "Available Rack Power" column, Rack(a) has the largest (e.g., "highest") available rack power capacity. Thus, in the illustrative set of Rack(a)-Rack(M), at operation 202, processing logic would select Rack(a) as the first server rack with the highest available rack power capacity.

At operation 203, the processing logic determines whether the first server rack has an available server. If the first server rack has an available server, processing logic proceeds to operation 204. If the first server rack does not have an available server, processing logic proceeds to operation 205. In at least one embodiment, processing logic can determine whether a server of a server rack is available based on the power usage of the server. Additional details regarding determining whether the server is available based on the power usage of the server are described with reference to FIGS. 3-4. In at least one embodiment, processing logic can determine whether a server of a server rack is available based on usage metrics of hardware components of the server. Additional details regarding determining whether the server is available based on usage metrics of the hardware components of the server are described with reference to FIG. 4.

At operation 204, responsive to determining the first server rack has an available server, processing logic assigns the set of processes to the available server on the first server rack. In at least one embodiment, processing logic can check whether a first server of the first server rack is available. Responsive to determining the first server of the first server rack is not available, processing logic can check whether a second server of the first server rack is available, etc. Additional details regarding selecting an available server from a rack are described with reference to FIGS. 3-5.

At operation 205, responsive to determining the first server rack does not have an available server, processing logic identifies a next server rack with a next-highest available rack power capacity. For example, referring to Table 1, as illustrated in the "Available Rack Power" column, Rack (a) has the largest (e.g., "highest") available rack power capacity, Rack(b) has the second largest (e.g., "next-highest") available rack power capacity, and Rack(M) has the smallest available rack power capacity. Thus, in the illustrative set of Rack(a)-Rack(M), at operation 205, processing logic would select Rack(b) as the next server rack with the next-highest available rack power capacity.

In at least one embodiment, where processing logic has started operation 205 in response to failing the operation 206, processing logic can then select the next server rack with the next-highest available rack power capacity. For example, referring again to Table 1, as illustrated in the "Available Rack Power" column, after processing logic determines that Rack(a) does not have an available server, and has determined that Rack(b) does not have an available server (e.g., the rack with the "next-highest" available power capacity), then in the illustrative example, the next-highest available power capacity is the available power capacity of Rack(M). Thus, in the illustrative set of Rack(a)-Rack(M), where Rack(a) and Rack(b) have a larger available rack power capacity than Rack(M), but neither Rack(a) nor Rack(b) have an available server, at operation 205, processing logic would select Rack(M) as the next server rack with the next-highest available rack power capacity. Additional details regarding selecting a server rack with an available rack power capacity (e.g., a "highest," or "next-highest rack power capacity" are described with reference to FIGS. 3-5).

At operation 206, processing logic determines whether the next server rack has an available server. In at least one embodiment, processing logic can check whether a first server of the first server rack is available. Responsive to determining the first server of the first server rack is not available, processing logic can check whether a second server of the first server rack is available, etc. Additional details regarding selecting an available server from a rack are described with reference to FIGS. 3-5. If the next server rack does not have an available server, processing logic returns to operation 205. If the next server rack does have an available server, processing logic proceeds to operation 207.

At operation 207, responsive to determining the next server rack has an available server, processing logic assigns the set of processes to the available server on the next server rack.

Figure 3:
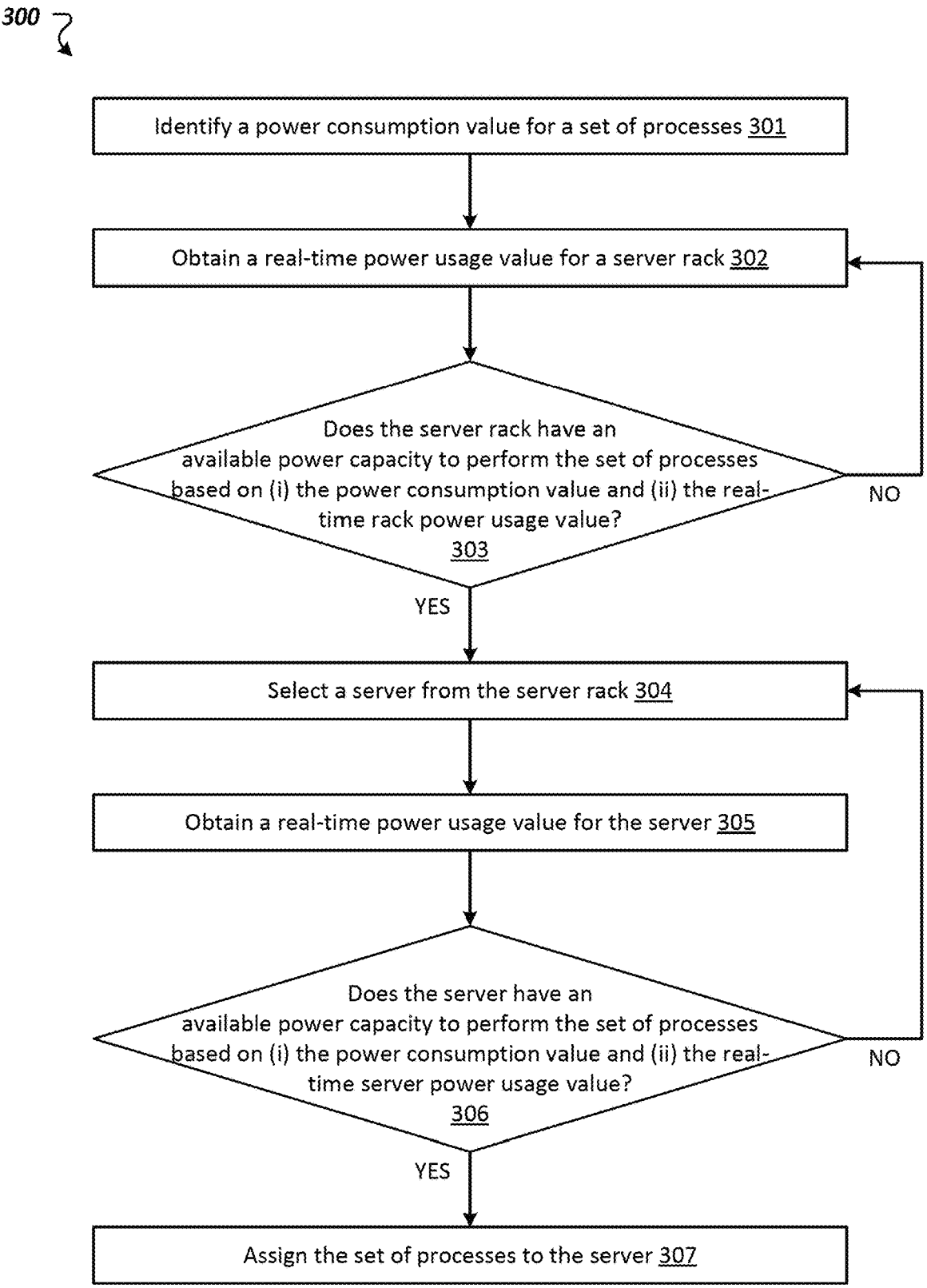
FIG. 3 illustrates a method of power-aware scheduling, according to aspects of the disclosure.

FIG. 3 illustrates a method 300 of power-aware scheduling, according to aspects of the disclosure. Method 300 can be performed by processing logic comprising hardware, software, firmware, or any combination thereof. The processing logic can be implemented in one or more computing devices. In at least one embodiment, method 300 can be performed by power-aware scheduling module 112 of FIGS. 1A-D. In another embodiment, the method 300 can be performed by the processing device 114 of FIG. 1A.

At operation 301, processing logic begins the method 300 by identifying a power consumption value for a set of processes. The set of processes can include one or more applications, jobs, tasks, routines, or the like. In at least one embodiment, the power consumption value for the set of processes can be determined using metadata included along with the set of processes. For example, and in at least one embodiment, a power consumption value can be included as metadata along with the set of processes when sent to the scheduler (such as the power-aware scheduling module 112 described with reference to FIGS. 1A-D). In at least one embodiment, the power consumption value for the set of processes can be determined based on the estimated compute resources of a server (e.g., a computing system 122 described with reference to FIGS. 1A-D) needed to perform the set of processes. Additional details regarding predicting an expected power consumption value for the set of processes based on compute resources of a server is described with reference to FIG. 4.

In at least one embodiment, the power consumption value for the set of processes can be determined based on historical power consumption values for previous sets of processes, or previous similar sets of processes performed at the data center, such as data center 101 described with reference to FIGS. 1A-D. In at least one embodiment, the power consumption value can be predicted a ML model trained on the historical power consumption values. Additional details regarding predicting an expected power consumption value for the set of processes based on historical power consumption values is described with reference to FIG. 5.

At operation 302, processing logic obtains a real-time power consumption value for a server rack. In at least one embodiment, processing logic can obtain respective real-time power consumption values for respective server racks of a data center, such as data center 101 as described in reference to FIGS. 1A-D. In at least one embodiment, the real-time power consumption value for a server rack can be obtained with a power monitoring module 130. The power monitoring module can include hardware, software, and/or firmware and can couple to power deliver units (PDUs) of one or more server racks. In at least one embodiment, a server rack can include multiple PDUs that provide electrical power to multiple servers on the server rack. In at least one embodiment, the power monitoring module, such as power monitoring module 130 can send a request, such as a IPMI request to one or more PDUs of a server rack that are coupled to servers of the server rack. In response, the power monitoring module can receive a metadata about the one or more PDUs of the server rack, which can include, for example, a real-time power usage value for the server rack. For example, if a server rack includes three PDUs, the IPMI response can indicate the real-time power output of each of the three PDUs. The power monitoring module can then sum the real-time power output of the three PDUs and represent the sum as a rack power usage value.

At operation 303, processing logic determines whether the server rack has an available power capacity to perform the set of processes based on (i) the power consumption value and (ii) the real-time rack power usage value. If the server rack does not have an available power capacity to perform the set of processes, processing logic returns to operation 302. If the server rack does have the available power capacity to perform the set of processes, processing logic proceeds to operation 304. In at least one embodiment, the available power capacity can be calculated by subtracting the real-time rack power usage value from a maximum rack power value. In at least one embodiment, the maximum rack power value can represent a usable power capacity of the rack, with a built-in overhead protection. The ratio of the usable power capacity of the rack to the maximum rack power value can be referred to as the "load factor ratio." For example, referring to Table 1 above, Rack(a) has a rack power capacity of 8 KW, which represents the usable power of the rack (e.g., the "maximum rack power value"). The power supplied by PDUs of the Rack(a) in this illustrative example can be 10 KW, thus representing a built-in overhead protection of 2 KW, or 20%, and the load-factor ratio is 80%. In this illustrative example, a 20% built-in overhead protection is considered, however, it can be appreciated that the built-in overhead protection can represent another percentage, such as 15%, or 10% (with load factor ratios representing 80%, 85%, and 90% respectively).

At operation 304, responsive to determining the server rack has an available power capacity to perform the set of processes, processing logic selects a server from the server rack. In at least one embodiment, processing logic can select a server of the server rack based on the power usage of the server. In at least one embodiment, processing logic can select a server based on usage metrics of hardware components of the server. Additional details regarding selecting a server are described with reference to FIG. 4.

At operation 305, processing logic obtains a real-time power usage value for the server. In at least one embodiment, a server rack can include multiple PDUs that provide electrical power to multiple servers on the server rack. In at least one embodiment, a server can be electrically coupled to two or more PDUs. In at least one embodiment, a server can obtain electrical power from two or more PDUs coupled to the server. For example, a power management module of the data center (which can be included in, or coupled to the power monitoring module 130 described in FIGS. 1A-D) can cause a server to draw 50% of the used electrical power from a first PDU coupled to the server and to draw 50% of the used electrical power from a second PDU coupled to the server. In at least one embodiment, the power monitoring module, such as power monitoring module 130 can send a request, such as a IPMI request to one or more PDUs coupled to servers of a server rack. In response, the power monitoring module can receive a metadata about the PDU, which can include, for example, a real-time power usage value for one or more servers coupled to the PDU.

At operation 306, processing logic determines whether the server has an available power capacity to perform the set of processes based on (i) the power consumption value and (ii) the real-time server power usage value. If the server does not have an available power capacity to perform the set of processes, processing logic returns to operation 304. If the server does have an available power capacity to perform the set of processes, processing logic proceeds to operation 307. In at least one embodiment, the available power capacity can be calculated by subtracting the real-time rack power usage value from a maximum power value associated with a server. In at least one embodiment, the maximum power value can represent a usable power capacity of the server, with a built-in overhead protection. For example, referring to Table 3 above, Server(a) has a server power capacity of 300 watts, which represents the usable power capacity of the rack (e.g., the "maximum power value.") The power supplied by PDUs to Server(a) in this illustrative example can be 400 watts, representing a built-in overhead protection of 100 watts, or 25%. In this illustrative example, a 25% built-in overhead protection is considered, however, it can be appreciated that the built-in overhead protection can represent another percentage, such as 10%, or 5% (with usable capacities representing 75%, 90%, and 95% respectively). In at least one embodiment, a server power capacity (e.g., the maximum power value) represents the power supplied by PDUs to the Server. Returning again to Table 3, for example, and in at least one embodiment, the server power capacity of Server(a) (e.g., 300 watts) can represent the power for the server available from one or more PDUs of a server rack, without a protection-overhead tolerance.

At operation 307, responsive to determining the server has an available power capacity to perform the set of processes, processing logic assigns the set of processes to the server.

Figure 4:
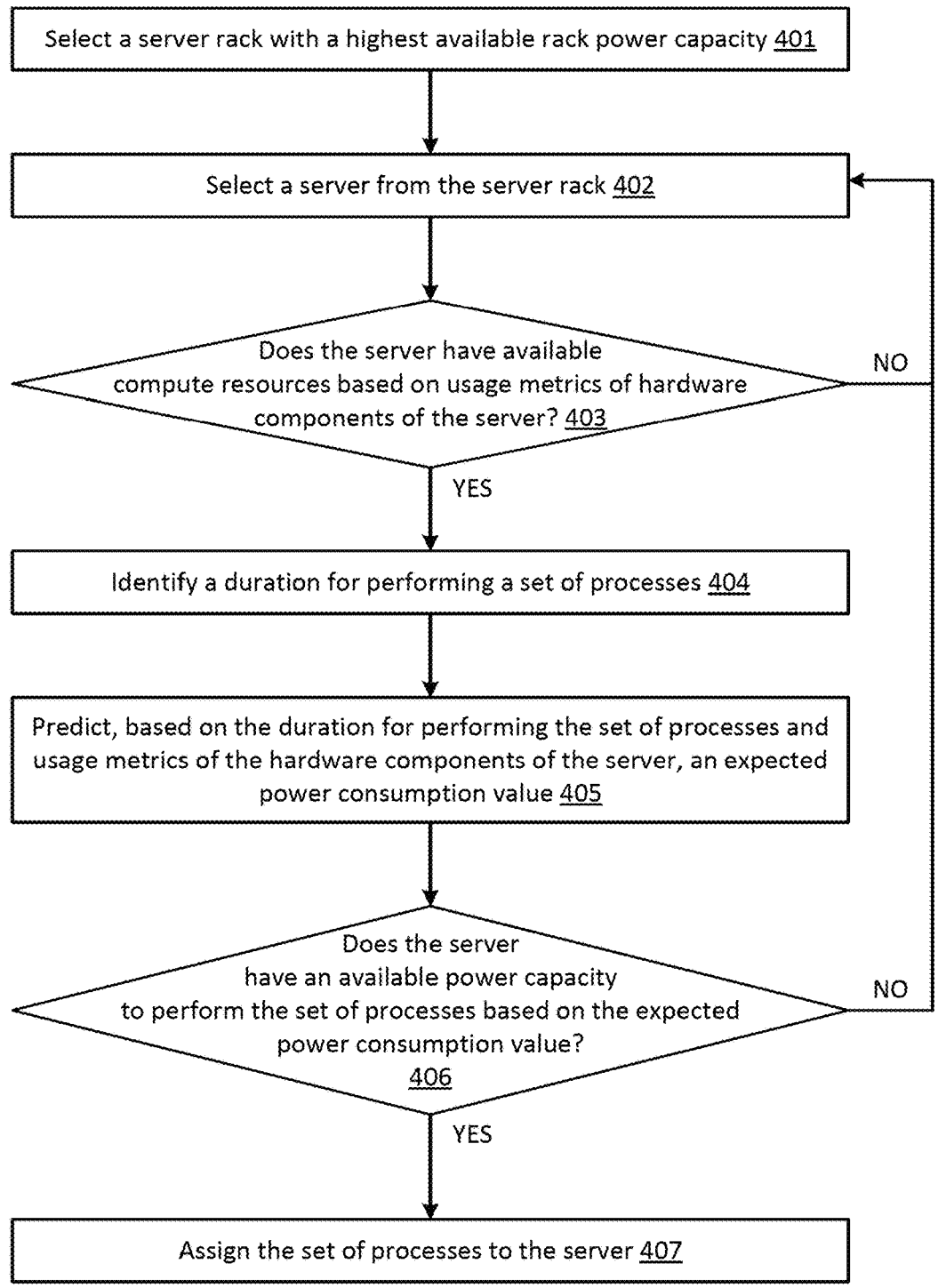
FIG. 4 illustrates a method of power-aware scheduling, according to aspects of the disclosure.

FIG. 4 illustrates a method 400 of power-aware scheduling, according to aspects of the disclosure. Method 400 can be performed by processing logic comprising hardware, software, firmware, or any combination thereof. The processing logic can be implemented in one or more computing devices. In at least one embodiment, method 400 can be performed by power-aware scheduling module 112 of FIGS. 1A-D. In another embodiment, the method 400 can be performed by the processing device 114 of FIG. 1A.

At operation 401, the processing logic begins the method 400 by selecting a server rack with a highest available rack power capacity. In at least one embodiment, the real-time power consumption value for a server rack can be obtained with a power monitoring module 130. The power monitoring module can include hardware, software, and/or firmware and can couple to power deliver units (PDUs) of one or more server racks. In at least one embodiment, a server rack can include multiple PDUs that provide electrical power to multiple servers on the server rack. In at least one embodiment, the power monitoring module, such as power monitoring module 130 can send a request, such as a IPMI request to one or more PDUs of a server rack that are coupled to servers of the server rack. In response, the power monitoring module can receive a metadata about the one or more PDUs of the server rack, which can include, for example, a real-time power usage value for the server rack. For example, if a server rack includes 3 PDUs, the IPMI response can indicate the real-time power output of each of the 3 PDUs. The power monitoring module can then sum the real-time power output of the 3 PDUs and represent the sum as a rack power usage value.

At operation 402, processing logic selects a server from the server rack. In at least one embodiment, processing logic can select a server of the server rack based on the power usage of the server. In at least one embodiment, processing logic can select a server based on usage metrics of hardware components of the server (e.g., as further described in operation 403, below).

At operation 403, processing logic determines whether the server has available compute resources based on usage metrics of hardware components of the selected server. If the server does not have available compute resources, processing logic returns to operation 402. If the server does have available compute resources, processing logic proceeds to operation 404. As described above, each server can include various hardware components, such as a CPU, a GPU, a DPU, a volatile memory and/or a nonvolatile memory. A "hardware usage metric" can refer to the ability of the various hardware components to accept a new process, and in at least one embodiment can be represented as a percentage. By way of a non-limiting example, a 75% usage metric for a CPU can represent that the CPU has an available 25% to take on additional processes. Each set of processes can have a required, or estimated compute resource load. That is, a set of processes can be associated with estimated usage metrics of the various hardware components. By way of a non-limiting example, a set of processes can require 5% of a server's CPU, 15% of the server's GPU, 5% of the server's DPU, 30% of the server's volatile memory, and 1% of the server's nonvolatile memory. Continuing with an illustrative example, if the usage metric corresponding to the server's volatile memory is at 80%, then based on the usage metrics of the hardware components of the server (e.g., the nonvolatile memory), the server is unable to perform the set of processes, because 80%+30% exceeds the available 100%, and thus the server would be unavailable (e.g., the server does not have available compute resources based on usage metrics of the hardware components of the server). Alternatively, continuing with another illustrative example, if the usage metric corresponding to the server's volatile memory is at 40%, and the remaining usage metrics corresponding to hardware components of the server are at 10%, then based on the usage metrics of the hardware components of the server, the server will be able to perform the set of processes, and thus the server would be available (e.g., the server has available compute resources based on usage metrics of the hardware components of the server).

At operation 404, responsive to determining the server has available compute resources, processing logic identifies a duration for performing a set of processes. In at least one embodiment, the duration for performing the set of processes can be based on the compute resources required to perform the process. In an illustrative example, if a server has a CPU with a certain clock speed, and the set of processes include a certain quantity of operations to be performed by the CPU, the duration for performing the set of processes can be expressed as: D=Q*R, where D is a duration expressed as a length of time, Q is the quantity of operations in the set of processes, and R is the quantity of operations that can be performed relative to each clock cycle, based on the CPU clock speed. For example, and in at least one embodiment, the CPU of a server can perform one or more operations per clock cycle, depending on the complexity of the operation, the number of cores in the CPU, and/or the number of threads in the CPU. The duration D can likewise be calculated for each hardware component of the server, such as GPUs, DPUs, and/or volatile or non-volatile memory devices. The duration $D_M$ that has the largest value of the durations D corresponding to each hardware component of the server can be identified as the duration for performing the set of processes. In at least one embodiment, additional considerations can adjust the duration $D_M$, such as bus bandwidth between hardware components, cache speed, and/or other signal latency limitations.

At operation 405, processing logic predicts, based on the duration for performing the set of processes and usage metrics of the hardware components of the server, an expected power consumption value. The duration for performing the set of processes can indicate how long the set of processes will take to perform, and the usage metrics of the hardware components of the server can indicate what percentage of the hardware component will be used to perform the set of processes. In at least one embodiment, the duration can be used by the power-aware scheduling module, such as power-aware scheduling module 112 of FIGS. 1A-1D to determine or estimate when a rack and/or server power usage values will change (relative to the estimated power consumption value) based on the completion of the set of processes.

In at least one embodiment, the expected power consumption value can be based on the duration for performing the set of processes, and the full amount of compute resources that the set of processes can use at any given time. In at least one embodiment, processing logic can use a power consumption table stored in a data store to determine the power distribution of a server, with respect to the hardware components. In at least one embodiment, to determine the expected power consumption value for the set of processes, processing logic can multiple the utilization metrics for each hardware component associated with the set of processes by the power distributions associated with each hardware component. In an illustrative example, processing logic can identify a duration of 30-minutes for a set of processes. The full amount of compute resources of the CPU that the set of processes can use is 5% (e.g., performing the set of processes will at most raise the CPU utilization metric by 5%), 10% for the GPU, 10% for the DPU, and 10% for memory. The power consumption table can indicate that the CPU uses 30% of the power provided to the server, the GPU uses 40%, the DPU uses 20% and the memory uses 10%. For a server with a maximum available power capacity of 300 watts, at full hardware utilization metrics (e.g., 100% utilization for each hardware component), the CPU can use 90 watts, the GPU can use 120 watts, the DPU can use 60 watts, and the memory can use 30 watts. In at least one embodiment, determining the expected power consumption value for the set of processes can be expressed as:

$$P_{Expected} = C(P_c) + G(P_g) + D(P_d) + M(P_m)$$

where $P_{Expected}$ is the expected power consumption value, C is the CPU utilization rate for the set of processes (e.g., 5%), G is the GPU utilization rate (e.g., 10%), D is the DPU utilization rate (e.g., 10%), M is the memory utilization rate (e.g., 10%); and $P_c$, $P_g$, $P_d$, and $P_m$ are the maximum power usable by the CPU, GPU, DPU, and memory respectively. Thus in the illustrative example, the expected power consumption value $P_{Expected}$=0.05(90 watts)+0.1(120 watts)+ 0.1(60 watts)+0.1(30 watts), or 6.6 watts.

Alternatively, in at least one embodiment, additional data can be used to determine the expected power consumption for the set of processes based on hardware utilization metrics of hardware components of the server. In at least one embodiment, the set of processes can be accompanied with metadata indicating an expected power consumption value to perform the set of processes. In at least one embodiment, the power consumption value for a single hardware component of the hardware components of the server can be used to determine the expected power consumption value for the set of processes. For example, if the power consumption value for a GPU to perform the set of processes is known or determined, processing logic can determine an expected power consumption value for the set of processes based on the power consumption value for the GPU.

At operation 406, processing logic determines whether the server has an available power capacity to perform the set of processes based on the expected power consumption value. If the server does not have the available power capacity, processing logic returns to operation 402. If the server does have the available power capacity, processing logic proceeds to operation 407. In at least one embodiment, the available power capacity can be calculated by subtracting the real-time rack power usage value from a maximum power value. In at least one embodiment, the maximum power value can represent a usable power capacity of the server, with a built-in overhead protection. For example, referring to Table 3 above, Server(a) has a server power capacity of 300 watts, which represents the usable power capacity of the rack (e.g., the "maximum power value"). The power supplied by PDUs to Server(a) in this illustrative example can be 400 watts, representing a built-in overhead protection of 100 watts, or 25%. In this illustrative example, a 25% built-in overhead protection is considered, however, it can be appreciated that the built-in overhead protection can represent another percentage, such as 10%, or 5% (with usable capacities representing 75%, 90%, and 95% respectively). In at least one embodiment, a server power capacity (e.g., the maximum power value) represents the power supplied by PDUs to the Server. Returning again to Table 3, for example, and in at least one embodiment, the server power capacity of Server(a) (e.g., 300 watts) can represent the power for the server available from one or more PDUs of a server rack, without a protection-overhead tolerance.

At operation 407, responsive to determining that the server has the available power capacity to perform the set of processes, processing logic assigns the set of processes to the server.

Figure 5:
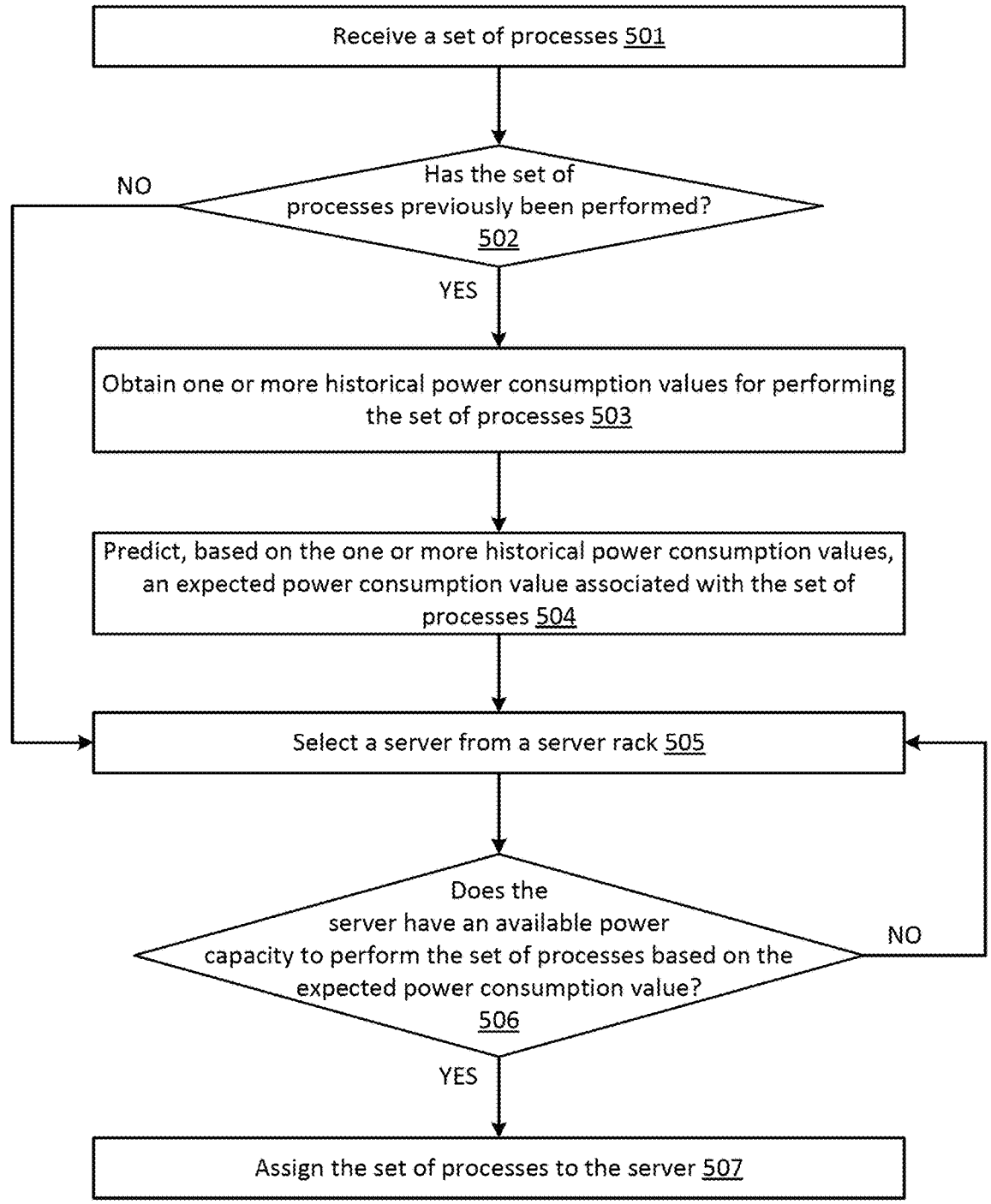
FIG. 5 illustrates a method of power-aware scheduling, according to aspects of the disclosure.

FIG. 5 illustrates a method 500 of power-aware scheduling, according to aspects of the disclosure. Method 500 can be performed by processing logic comprising hardware, software, firmware, or any combination thereof. The processing logic can be implemented in one or more computing devices. In at least one embodiment, method 500 can be performed by power-aware scheduling module 112 of FIGS. 1A-D. In another embodiment, the method 500 can be performed by the processing device 114 of FIG. 1A.

At operation 501, the processing logic begins the method 500 by receiving a set or processes. The set of processes can include one or more applications, jobs, tasks, routines, or the like. In at least one embodiment, the set of processes can be received at a scheduler, such as scheduler 110 or power-aware scheduling module 112 as described with reference to FIGS. 1A-D. In at least one embodiment, metadata associated with the set of processes can be received along with the set of processes. For example, and in at least one embodiment, a power consumption value can be received as metadata along with the set of processes. In another example, and in at least one embodiment, a job ID can be received as metadata along with the set of processes. The job ID can be unique to the set of processes. In at least one embodiment, the job ID can indicate a job family ID. In at least one embodiment, a job family ID can be received as metadata with the set of processes. For example, and in at least one embodiment, a job ID can uniquely identify a particular set of processes from other sets of processes (concurrent or historical) and a job family ID can identify a type or "family" of sets of processes (e.g., a repeated set of processes run at different times, or in different conditions).

At operation 502, determines whether the set of processes have previously been performed. If the set of processes have not previously been performed, processing logic jumps to operation 505. If the set of processes have previously been performed, processing logic proceeds to operation 503. In at least one embodiment, processing logic can use a job ID to determine whether a given set of processes have previously been performed. In at least one embodiment, processing logic can use a job ID and/or a job family ID to determine whether sets of processes similar to the received set of processes have previously been performed. In at least one embodiment, processing logic can use additional metadata associated with the received set of processes to determine whether the set of processes have previously been performed. For example, and in at least one embodiment, associated metadata can include a power consumption value associated with the set of processes, a compute resource requirement for the set of processes, etc.

At operation 503, responsive to determining that the set of processes have previously been performed, processing logic obtains one or more historical power consumption values for performing the set of processes. In at least one embodiment, the one or more historical power consumption values for performing the set of processes (or a similar set of processes) can be stored in a data store associated with the scheduler (such as data store 116). In at least one embodiment, while a set of processes is being performed, a power monitoring module, (e.g., power monitoring module 130 described with reference to FIGS. 1A-D) can record, in real-time at specified intervals (e.g., every 5 seconds, every 5 minutes, every 5 hours, etc.), the power consumption value associated with the set of processes. In at least one embodiment, the power monitoring module 130 can record a maximum power consumption value associated with performing the set of processes. In an illustrative example, a set of processes can be performed over a 30-minute interval. During the 30-minute interval, a maximum power consumption value associated with performing the set of processes can refer to a peak power usage value during the 30-minute interval that was required to perform the set of processes.

In at least one embodiment, the historical power consumption value for a set of processes can be estimated based on a power usage value of a server performing the set of processes (along with other sets of processes) over the duration of time required to perform the set of processes. In an illustrative example, a first set of processes can be performed by a server over a 30-minute duration. Concurrently, one or more additional sets of processes can be performed by the server during the 30-minute duration. The quantity of the one or more additional sets of processes during the 30-minute duration can fluctuate based on each respective set of processes (e.g., a set of processes can start, stop, and/or start and stop over the 30-minute duration). By using timestamps associated with each set of processes (e.g., a start and end time), and real-time power usage values for the server collected at regular intervals during the 30-minute duration, the power monitoring module 130 can estimate a power consumption value associated with actually performing the set of processes, and store that estimated power consumption value in data store 116 as a historical power consumption value associated with a given set of processes.

At operation 504, processing logic predicts, based on the one or more historical power consumption values, an expected power consumption value associated with the set of processes. In at least one embodiment, processing logic can determine an average, mean, median, or mode of historical power consumption values for a set of processes in order to predict the estimated power consumption value. In at least one embodiment, an ML model can be trained on the historical power consumption values for the set of processes. In at least one embodiment, the ML model can be trained on metadata associated with performing previous sets of processes. The ML model can identify various hidden patterns in the historical power consumption values associated with a set of processes or group of sets of processes (e.g., a sets of processes with the same job ID or job family ID). In at least one embodiment, the ML model can be trained using historical power consumption values and ground truth data. As described above, in at least one embodiment, the ML model can be one or more of a logistics regression model, a k-nearest neighbor model, a random forest regression model, a gradient boost model, or an XGBoost model. Alternatively, in at least one embodiment, other types of ML models can be used. The trained ML model can be deployed as an object to a computing device operatively coupled to the power monitoring module 130 and/or a power-aware scheduling module (e.g., power-aware scheduling module 112 as described with reference to FIGS. 1A-D).

At operation 505, processing logic selects a server from a server rack. In at least one embodiment, processing logic can select a server based on usage metrics of hardware components of the server.

At operation 506, processing logic determines whether the server has an available power capacity to perform the set of processes based on the expected power consumption value. If the server does not have the available power capacity to perform the set of processes, processing logic returns to operation 505. If the server does have the available power capacity to perform the set of processes, processing logic proceeds to operation 507. In at least one embodiment, the available power capacity can be calculated by subtracting the real-time rack power usage value from a maximum power value of a server. In at least one embodiment, the maximum power value can represent a usable power capacity of the server, with a built-in overhead protection. For example, referring to Table 3 above, Server(a) has a server power capacity of 300 watts, which represents the usable power capacity of the server (e.g., the "maximum power value"). The power supplied by PDUs to Server(a) in this illustrative example can be 400 watts, representing a built-in overhead protection of 100 watts, or 25%. In this illustrative example, a 25% built-in overhead protection is considered, however, it can be appreciated that the built-in overhead protection can represent another percentage, such as 10%, or 5% (with usable capacities representing 75%, 90%, and 95% respectively). In at least one embodiment, a server power capacity (e.g., the maximum power value) represents the power supplied by PDUs to the Server. Returning again to Table 3, for example, and in at least one embodiment, the server power capacity of Server(a) (e.g., 300 watts) can represent the power for the server available from one or more PDUs of a server rack, without a protection-overhead tolerance.

At operation 507, responsive to determining the server has the available power capacity, processing logic assigns the set of processes to the server.

Data Center

Figure 6:
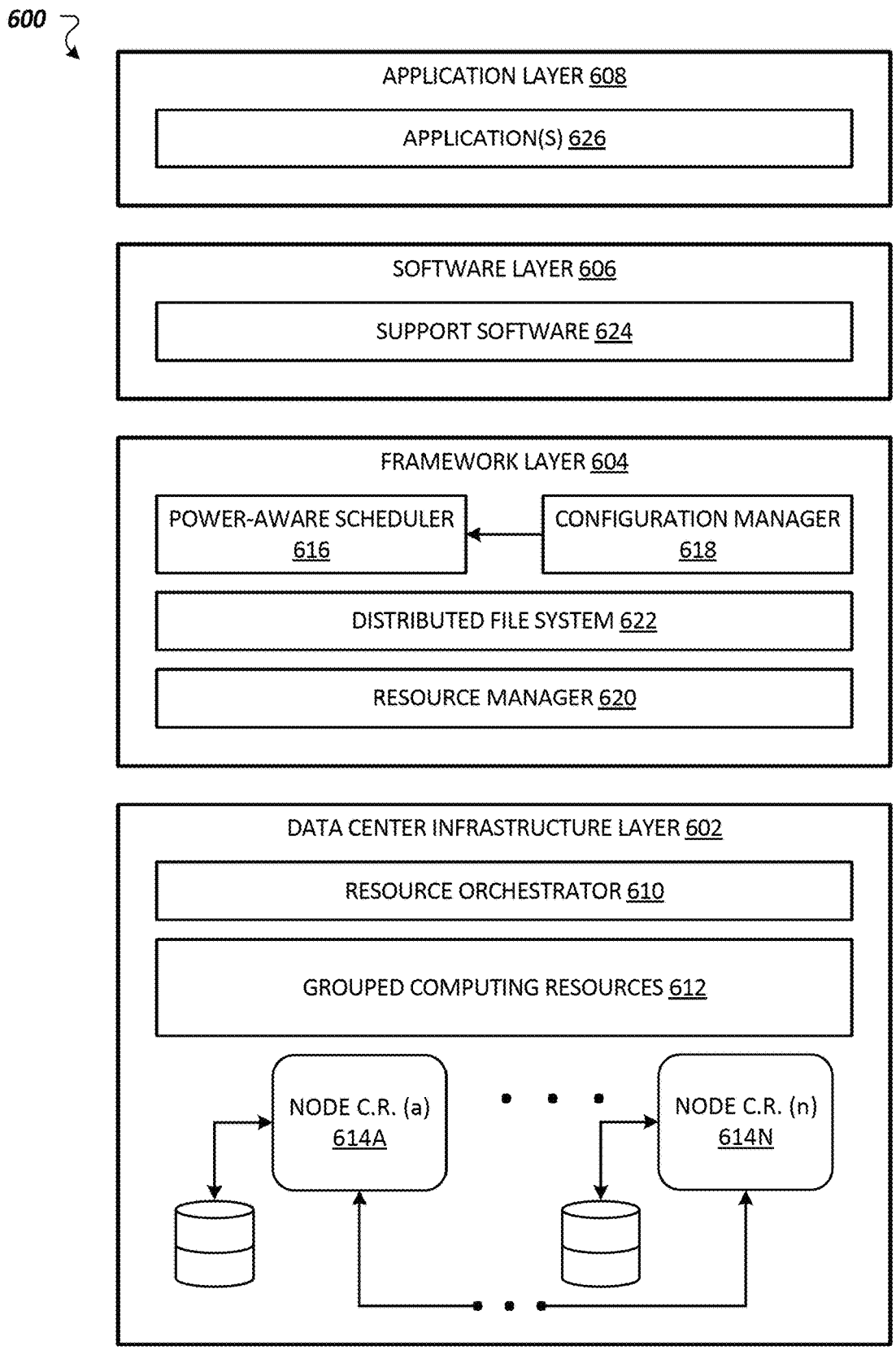
FIG. 6 illustrates an example of a data center, according to aspects of the disclosure.

FIG. 6 illustrates an example of a data center 600, according to aspects of the disclosure. In at least one embodiment, data center 600 includes a data center infrastructure layer 602, a framework layer 604, a software layer 606, and an application layer 608.

In at least one embodiment, as shown in FIG. 6, data center infrastructure layer 602 can include a resource orchestrator 610, grouped computing resources 612, and node computing resources (node C.R.s) 614A(a)-614N(n), where "N" represents any whole, positive integer. In at least one embodiment, node C.R.s 614A(a)-614N(n) can include, but are not limited to, any number of central processing units (CPUs) or other processors (including accelerators, field-programmable gate arrays (FPGAs), graphics processors, etc.), memory devices (e.g., dynamic read-only memory), storage devices (e.g., solid-state or disk drives), network input/output (NW I/O) devices, network switches, virtual machines (VMs), power modules, and cooling modules, etc. In at least one embodiment, one or more node C.R.s from among node C.R.s 614A(a)-614N(n) can be a server having one or more of the above-mentioned computing resources.

In at least one embodiment, grouped computing resources 612 can include separate groupings of node C.R.s housed within one or more racks (not illustrated) or many racks housed in data centers at various geographical locations (also not illustrated). Separate groupings of node C.R.s within grouped computing resources 612 can include grouped compute, network, memory, or storage resources that can be configured or allocated to support one or more workloads. In at least one embodiment, several node C.R.s, including CPUs or processors, can be grouped within one or more racks to provide compute resources to support one or more workloads. In at least one embodiment, one or more racks can also include any number of power modules, cooling modules, and network switches, in any combination.

In at least one embodiment, resource orchestrator 610 can configure or otherwise control one or more node C.R.s 614A(a)-614N(n) and/or grouped computing resources 612. In at least one embodiment, the resource orchestrator 610 can include a software design infrastructure (SDI) management entity for data center 600. In at least one embodiment, the resource orchestrator 610 can include hardware, software, or some combination thereof.

In at least one embodiment, as shown in FIG. 6, framework layer 604 includes a power-aware scheduler 616, a configuration manager 618, a resource manager 620, and a distributed file system 622. In at least one embodiment, the power aware scheduler can be a scheduler 110 including a power-aware scheduling module 112 as described with reference to FIG. 1A. In at least one embodiment, framework layer 604 can include a framework to support software 624 of software layer 606 and/or one or more application(s) 626 of application layer 608. In at least one embodiment, support software 624 or application(s) 626 can respectively include web-based service software or applications, such as those provided by Amazon Web Services, Google Cloud, and Microsoft Azure. In at least one embodiment, framework layer 604 can be, but is not limited to, a type of free and open-source software web application framework such as Apache Spark™ (hereinafter "Spark") that can use a distributed file system 622 for large-scale data processing (e.g., "big data"). In at least one embodiment, power-aware scheduler 616 can include a Spark driver to facilitate scheduling workloads supported by various layers of data center 600. In at least one embodiment, configuration manager 618 can be capable of configuring different layers, such as software layer 606 and framework layer 604, including Spark and distributed file system 622, for supporting large-scale data processing. In at least one embodiment, resource manager 620 can be capable of managing clustered or grouped computing resources mapped to or allocated for support of distributed file system 622 and power-aware scheduler 616. In at least one embodiment, clustered or grouped computing resources can include grouped computing resources 612 at data center infrastructure layer 602. In at least one embodiment, resource manager 620 can coordinate with resource orchestrator 610 to manage these mapped or allocated computing resources.

In at least one embodiment, support software 624 included in software layer 606 can include software used by at least portions of node C.R.s 614A(a)-614N(n), grouped computing resources 612, and/or distributed file system 622 of framework layer 604. The one or more types of software can include, but are not limited to, internet web page search software, email virus scan software, database software, and streaming video content software.

In at least one embodiment, application(s) 626 included in application layer 608 can include one or more types of applications used by at least portions of node C.R.s 614A(a)-614N(n), grouped computing resources 612, and/or distributed file system 622 of framework layer 604. One or more types of applications can include, but are not limited to, any number of genomics applications, cognitive computing, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 618, resource manager 620, and resource orchestrator 610 can implement any number and type of self-modifying actions based on any amount and type of data acquired in any technically feasible fashion. In at least one embodiment, self-modifying actions can relieve a data center operator of data center 600 from making possibly bad configuration decisions and possibly avoiding underutilized and/or poor-performing portions of a data center.

In at least one embodiment, data center 600 can include tools, services, software, or other resources to train one or more machine learning models or predict or infer information using one or more machine learning models according to one or more embodiments described herein. For example, in at least one embodiment, a machine learning model can be trained by calculating weight parameters according to a neural network architecture using software and computing resources described above with respect to data center 600. In at least one embodiment, trained machine learning models corresponding to one or more neural networks can be used to infer or predict information using resources described above with respect to data center 600 by using weight parameters calculated through one or more training techniques described herein.

In at least one embodiment, data center 600 can use CPUs, application-specific integrated circuits (ASICs), GPUs, FPGAs, or other hardware to perform training and/or inferencing using the above-described resources. Moreover, one or more software and/or hardware resources described above can be configured as a service to allow users to train or perform inferencing of information, such as image recognition, speech recognition, or other artificial intelligence services.

Computer Systems

Figure 7:
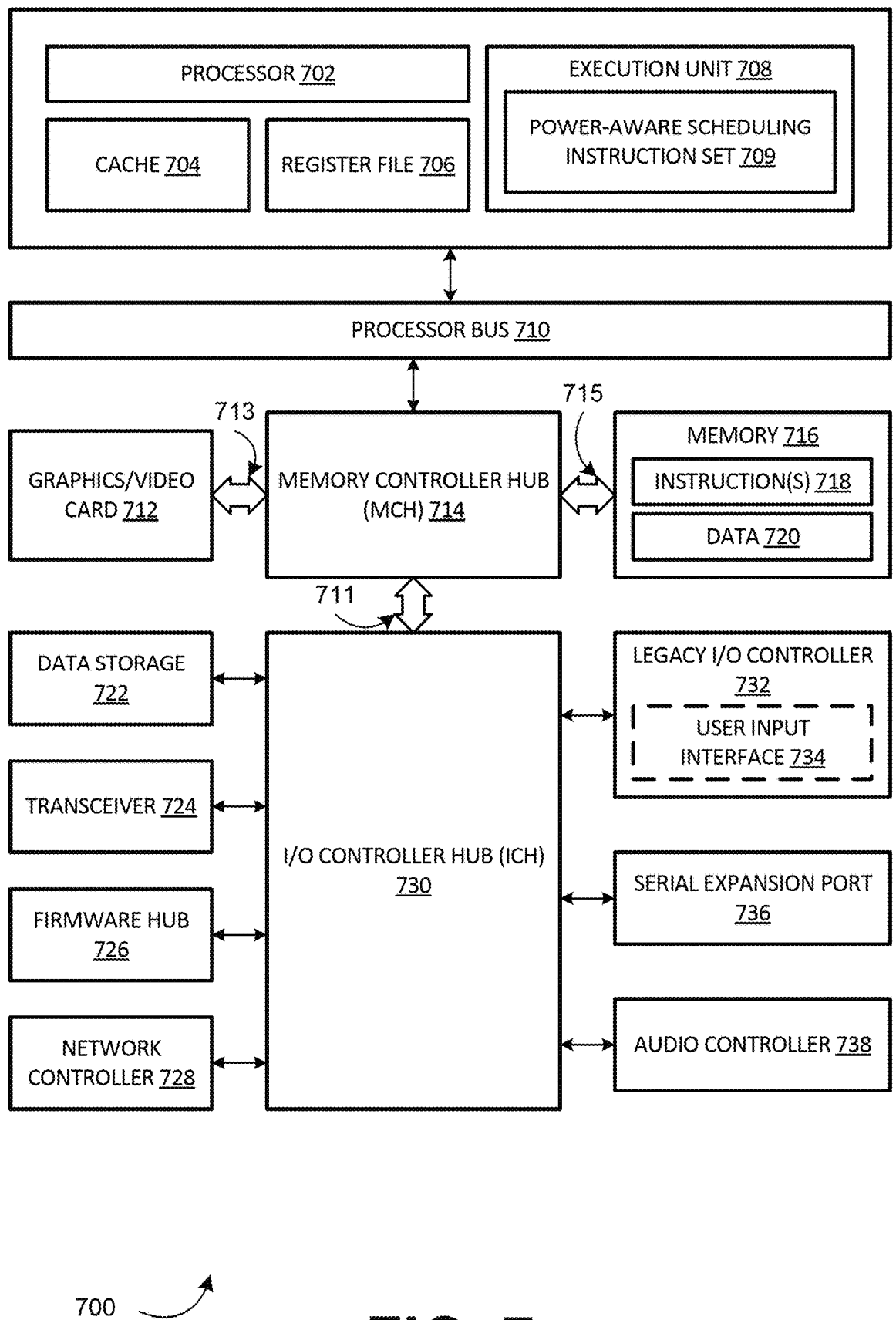
FIG. 7 is a block diagram illustrating an exemplary computer system which can be a system with interconnected devices and components, a system-on-a-chip (SOC), or some combination thereof, according to aspects of the disclosure.

FIG. 7 is a block diagram illustrating an exemplary computer system, such as computer system 700, which can be a system with interconnected devices and components, a system-on-a-chip (SOC), or some combination thereof, according to aspects of the disclosure. In at least one embodiment, computer system 700 can include, without limitation, a component, such as a processor 702, to employ execution units including logic to perform algorithms for process data, in accordance with the present disclosure, such as in the embodiments described herein. In at least one embodiment, computer system 700 can include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) can also be used. In at least one embodiment, computer system 700 can execute a version of WINDOWS' operating system available from Microsoft Corporation of Redmond, Wash., although other operating systems (UNIX and Linux, for example), embedded software, and/or graphical user interfaces, can also be used.

Embodiments can be used in other devices such as handheld devices and embedded applications. Some examples of handheld devices include cellular phones, internet Protocol devices, digital cameras, personal digital assistants (PDAs), and handheld PCs. In at least one embodiment, embedded applications can include a microcontroller, a digital signal processor (DSP), a system on a chip, network computers (NetPCs), set-top boxes, network hubs, wide area network (WAN) switches, or any other system that can perform one or more instructions in accordance with at least one embodiment.

In at least one embodiment, computer system 700 can include, without limitation, processor 702 that can include, without limitation, one or more execution units 708 to perform operations according to techniques described herein. In at least one embodiment, computer system 700 is a single-processor desktop or server system, but in another embodiment, the computer system 700 can be a multiprocessor system. In at least one embodiment, processor 702 can include, without limitation, a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In at least one embodiment, processor 702 can be coupled to a processor bus 710 that can transmit data signals between processor 702 and other components in computer system 700.

In at least one embodiment, processor 702 can include, without limitation, a Level 1 (L1) internal cache memory (cache) cache 704. In at least one embodiment, processor 702 can have a single internal cache or multiple levels of internal cache. In at least one embodiment, the cache memory can reside external to processor 702. Other embodiments can also include a combination of both internal and external caches depending on particular implementation and needs. In at least one embodiment, register file 706 can store different types of data in various registers, including and without limitation, integer registers, floating-point registers, status registers, and instruction pointer registers.

In at least one embodiment, an execution unit 708, including and without limitation, logic to perform integer and floating-point operations, also reside in processor 702. In at least one embodiment, processor 702 can also include a microcode (ucode) read-only memory (ROM) that stores microcode for certain macro instructions. In at least one embodiment, execution unit 708 can include logic to handle a power-aware scheduling instruction set 709. In at least one embodiment, by including power-aware scheduling instruction set 709 in an instruction set of a general-purpose processor, such as processor 702, along with associated circuitry to execute instructions, operations used by many multimedia applications can be performed using packed data in a general-purpose processor, such as processor 702. In one or more embodiments, many multimedia applications can be accelerated and executed more efficiently by using the full width of a processor's data bus for performing operations on packed data, which can eliminate the need to transfer smaller units of data across the processor's data bus to perform one or more operations one data element at a time.

In at least one embodiment, execution unit 708 can also be used in microcontrollers, embedded processors, graphics devices, DSPs, and other types of logic circuits. In at least one embodiment, computer system 700 can include, without limitation, a memory 716. In at least one embodiment, memory 716 can be implemented as a Dynamic Random Access Memory (DRAM) device, a Static Random Access Memory (SRAM) device, a flash memory device, or other memory devices. In at least one embodiment, memory 716 can store instruction(s) 718 and/or data 720 represented by data signals that can be executed by processor 702.

In at least one embodiment, the system logic chip can be coupled to processor bus 710 and memory 716. In at least one embodiment, the system logic chip can include, without limitation, a memory controller hub (MCH), such as MCH 714, and processor 702 can communicate with MCH 714 via processor bus 710. In at least one embodiment, MCH 714 can provide a high bandwidth memory path 715 to memory 716 for instruction and data storage and for storage of graphics commands, data, and textures. In at least one embodiment, MCH 714 can direct data signals between processor 702, memory 716, and other components in computer system 700 and bridge data signals between processor bus 710, memory 716, and a system I/O 711. In at least one embodiment, a system logic chip can provide a graphics port for coupling to a graphics controller. In at least one embodiment, MCH 714 can be coupled to memory 716 through a high bandwidth memory path 715, and graphics/video card 712 can be coupled to MCH 714 through an Accelerated Graphics Port (AGP) interconnect 713.

In at least one embodiment, computer system 700 can use the system I/O 711 that is a proprietary hub interface bus to couple the MCH 714 to I/O controller hub (ICH), such as ICH 730. In at least one embodiment, ICH 730 can provide direct connections to some I/O devices via a local I/O bus. In at least one embodiment, a local I/O bus can include, without limitation, a high-speed I/O bus for connecting peripherals to memory 716, chipset, and processor 702. Examples can include, without limitation, data storage 722, a transceiver 724, a firmware hub (flash BIOS) 726, a network controller 728, a legacy I/O controller 732 containing a user input interface 734, a serial expansion port 736, such as Universal Serial Bus (USB), and an audio controller 738. In at least one embodiment, data storage 722 can include a hard disk drive, a floppy disk drive, a CD-ROM device, a flash memory device, or other mass storage devices.

In at least one embodiment, FIG. 7 illustrates a computer system 700, which includes interconnected hardware devices or "chips," whereas, in other embodiments, FIG. 7 can illustrate an exemplary System on a Chip (SoC). In at least one embodiment, devices can be interconnected with proprietary interconnects, standardized interconnects (e.g., PCIe), or some combination thereof. In at least one embodiment, one or more components of computer system 700 are interconnected using compute express link (CXL) interconnects.

Figure 8:
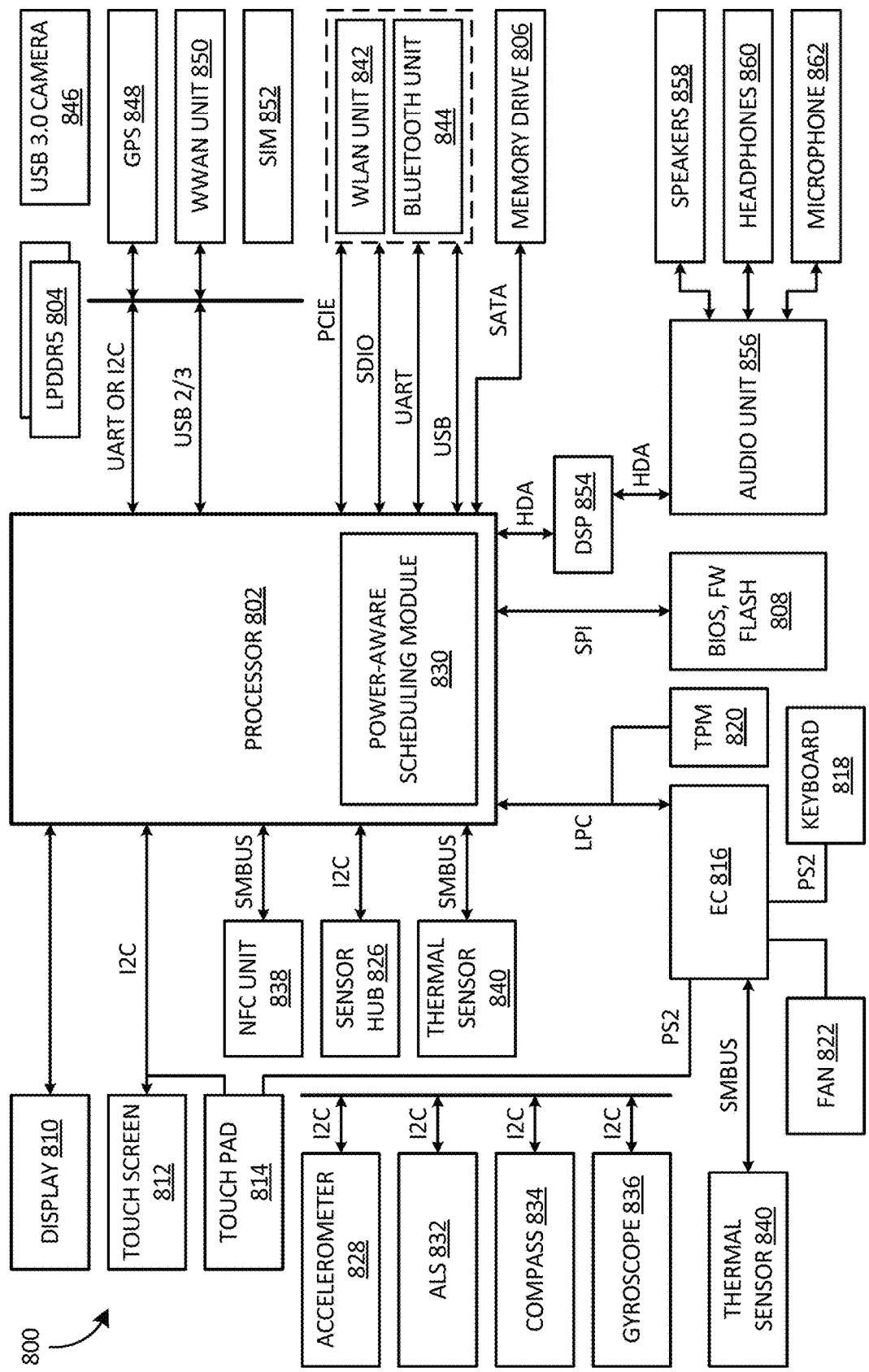
FIG. 8 is a block diagram illustrating an electronic device for using a processor, according to aspects of the disclosure.

FIG. 8 is a block diagram illustrating an electronic device 800 for using a processor 802, according to aspects of the disclosure. In at least one embodiment, electronic device 800 can be, for example, and without limitation, a notebook, a tower server, a rack server, a blade server, a laptop, a desktop, a tablet, a mobile device, a phone, an embedded computer, or any other suitable electronic device.

In at least one embodiment, electronic device 800 can include, without limitation, processor 802 communicatively coupled to any suitable number or kind of components, peripherals, modules, or devices. In at least one embodiment, processor 802 coupled using a bus or interface, such as an I2C bus, a System Management Bus (SMBus), a Low Pin Count (LPC) bus, a Serial Peripheral Interface (SPI), a High Definition Audio (HDA) bus, a Serial Advance Technology Attachment (SATA) bus, a Universal Serial Bus (USB) (including versions 1, 2, and 3), or a Universal Asynchronous Receiver/Transmitter (UART) bus. In at least one embodiment, FIG. 8 illustrates a system, which includes interconnected hardware devices or "chips," whereas in other embodiments, FIG. 8 can illustrate an exemplary System on a Chip (SoC). In at least one embodiment, devices illustrated in FIG. 8 can be interconnected with proprietary interconnects, standardized interconnects (e.g., PCIe), or some combination thereof. In at least one embodiment, one or more components of FIG. 8 are interconnected using compute express link (CXL) interconnects.

In at least one embodiment, FIG. 8 can include a display 810, a touch screen 812, a touch pad 814, a Near Field Communications unit (NFC) 838, a sensor hub 826, a thermal sensor 840, an Express Chipset (EC), such as EC 816, a Trusted Platform Module (TPM), such as TPM 820, BIOS/firmware (FW)/flash memory, such as BIOS, FW Flash 808, a DSP 854, a memory drive 806 such as a Solid State Disk (SSD) or a Hard Disk Drive (HDD), a wireless local area network unit (WLAN), such as WLAN unit 842, a Bluetooth unit 844, a Wireless Wide Area Network unit (WWAN), such as WWAN unit 850, a Global Positioning System (GPS) 848, a camera (USB 3.0 camera) 846, such as a USB 3.0 camera, and/or a Low Power Double Data Rate (LPDDR) memory unit, such as LPDDR5 804 implemented in, for example, LPDDR5 standard. These components can each be implemented in any suitable manner.

In at least one embodiment, other components can be communicatively coupled to processor 802 through the components discussed above. In at least one embodiment, processor 802 can include a power-aware scheduling module 830. In at least one embodiment, an accelerometer 828, Ambient Light Sensor (ALS), such as ALS 832, compass 834, and a gyroscope 836 can be communicatively coupled to sensor hub 826. In at least one embodiment, thermal sensor 840, a fan 822, a keyboard 818, and a touch pad 814 can be communicatively coupled to EC 816. In at least one embodiment, speakers 858, headphones 860, and microphone 862 can be communicatively coupled to an audio unit 856 which can, in turn, be communicatively coupled to DSP 854. In at least one embodiment, audio unit 856 can include, for example, and without limitation, an audio coder/decoder (codec) and a class-D amplifier. In at least one embodiment, a subscriber identification module (SIM) card, such as SIM 852 can be communicatively coupled to WWAN unit 850. In at least one embodiment, components such as WLAN unit 842 and Bluetooth unit 844, as well as WWAN unit 850 can be implemented in a Next Generation Form Factor (NGFF).

Figure 9:
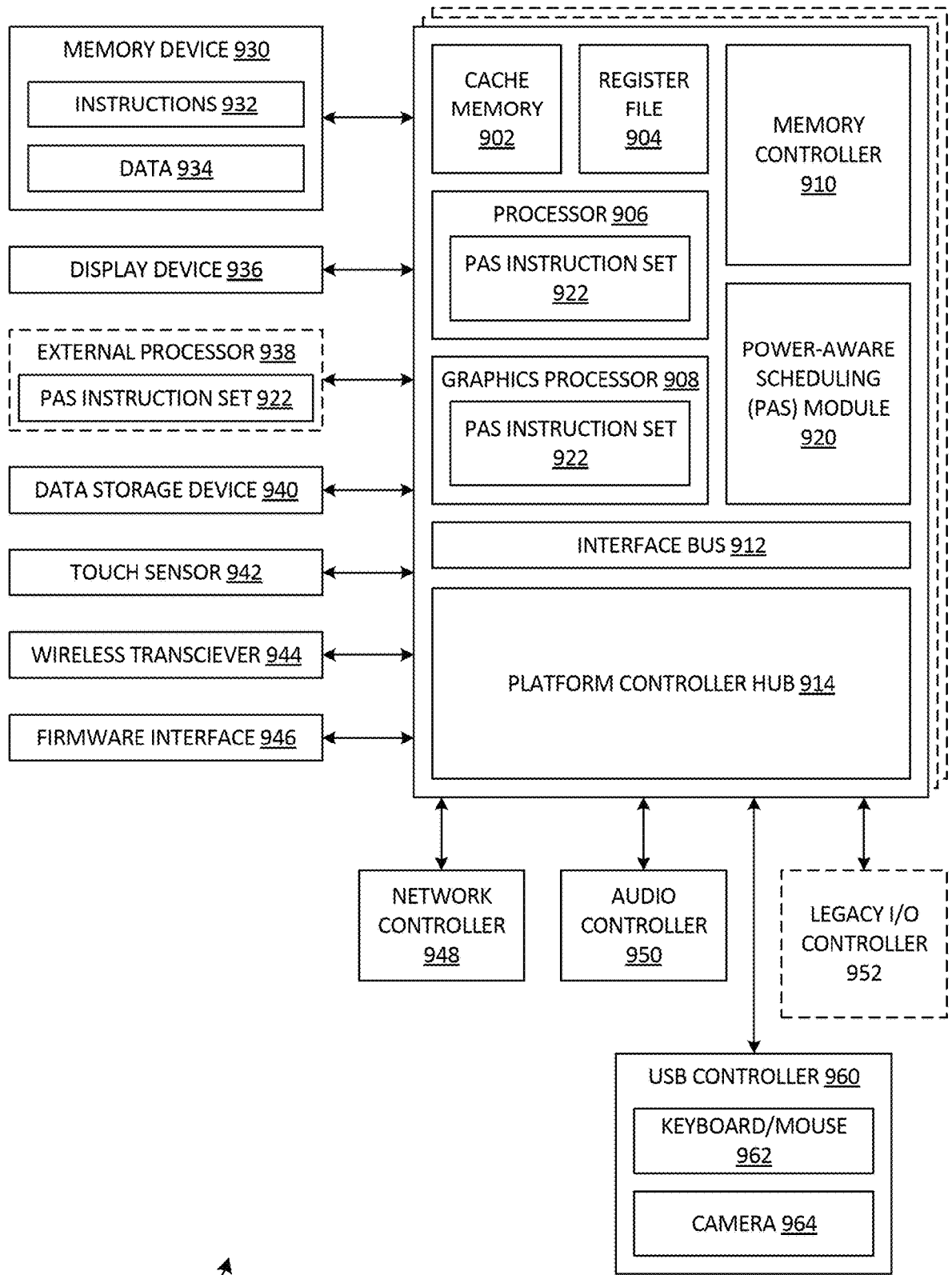
FIG. 9 is a block diagram of a processing system 900, according to aspects of the disclosure.

FIG. 9 is a block diagram of a processing system 900, according to aspects of the disclosure. In at least one embodiment, the processing system 900 includes cache memory 902, register file 904, processors 906, graphics processors 908, memory controller 910, interface bus 912, platform controller hub 914, and power-aware scheduling module 920. Processing system 900 can be a single processor desktop system, a multiprocessor workstation system, or a server system having a large number of processors 906 or graphics processors 908. In at least one embodiment, the processing system 900 is a processing platform incorporated within a system-on-a-chip (SoC) integrated circuit for use in mobile, handheld, or embedded devices.

In at least one embodiment, the processing system 900 can include, or be incorporated within a server-based gaming platform, a game console, including a game and media console, a mobile gaming console, a handheld game console, or an online game console. In at least one embodiment, the processing system 900 is a mobile phone, smartphone, tablet computing device, or mobile internet device. In at least one embodiment, the processing system 900 can also include, couple with, or be integrated within a wearable device, such as a smart watch wearable device, smart eyewear device, augmented reality device, or virtual reality device. In at least one embodiment, the processing system 900 is a television or set-top box device having one or more processors 906 and a graphical interface generated by one or more graphics processors 908.

In at least one embodiment, one or more processors 906 each include one or more of the processor cores to process instructions which, when executed, perform operations for system and user software. In at least one embodiment, one or more processors 906 and/or one or more graphics processors can be configured to process a portion of the power-aware scheduling (PAS) instruction set, such as PAS instruction set 922. In at least one embodiment, PAS instruction set 922 can facilitate Complex Instruction Set Computing (CISC), Reduced Instruction Set Computing (RISC), or computing via a Very Long Instruction Word (VLIW). In at least one embodiment, processor cores can each process a different instruction set from PAS instruction set 922, which can include instructions to facilitate emulation of other instruction sets (not illustrated). In at least one embodiment, processor cores can also include other processing devices, such as a Digital Signal Processor (DSP).

In at least one embodiment, processors 906 includes cache memory 902. In at least one embodiment, processors 906 can have a single internal cache or multiple levels of internal cache. In at least one embodiment, cache memory 902 is shared among various components of processors 906. In at least one embodiment, processors 906 also uses an external cache (e.g., a Level-3 (L3) cache or Last Level Cache (LLC)) (not illustrated), which can be shared among processor cores using known cache coherency techniques. In at least one embodiment, register file 904 is additionally included in processors 906, which can include different types of registers for storing different types of data (e.g., integer registers, floating-point registers, status registers, and an instruction pointer register). In at least one embodiment, register file 904 can include general-purpose registers or other registers.

In at least one embodiment, one or more processors 906 are coupled with one or more interface bus 912 to transmit communication signals such as address, data, or control signals between processor cores and other components in processing system 900. In at least one embodiment, interface bus 912, in one embodiment, can be a processor bus, such as a version of a Direct Media Interface (DMI) bus. In at least one embodiment, interface bus 912 is not limited to a DMI bus, and can include one or more Peripheral Component Interconnect buses (e.g., PCI, PCI Express), memory busses, or other types of interface busses. In at least one embodiment, processors 906 include an integrated memory controller (e.g., memory controller 910) and a platform controller hub 914 (PCH). In at least one embodiment, memory controller 910 facilitates communication between a memory device and other components of the processing system 900, while platform controller hub 914 provides connections to I/O devices via a local I/O bus.

In at least one embodiment, the memory device 930 can be a dynamic random access memory (DRAM) device, a static random access memory (SRAM) device, a flash memory device, a phase-change memory device, or some other memory device having suitable performance to serve as process memory. In at least one embodiment, the memory device 930 can operate as system memory for processing system 900 to store instructions 932 and data 934 for use when one or more processors 906 executes an application or process. In at least one embodiment, memory controller 910 also optionally couples with an external processor 938, which can communicate with one or more graphics processors 908 in processors 906 to perform graphics and media operations. In at least one embodiment, a display device 936 can connect to processors 906. In at least one embodiment, the display device 936 can include one or more of an internal display device, as in a mobile electronic device or a laptop device, or an external display device attached via a display interface (e.g., DisplayPort, etc.). In at least one embodiment, display device 936 can include a head-mounted display (HMD) such as a stereoscopic display device for use in virtual reality (VR) applications or augmented reality (AR) applications.

In at least one embodiment, the platform controller hub 914 enables peripherals to connect to memory device 930 and processors 906 via a high-speed I/O bus. In at least one embodiment, I/O peripherals include, but are not limited to, a data storage device 940 (e.g., hard disk drive, flash memory, etc.), a touch sensor 942, a wireless transceiver 944, firmware interface 946, a network controller 948, or an audio controller 950.

In at least one embodiment, the data storage device 940 can connect via a storage interface (e.g., SATA) or via a peripheral bus, such as a Peripheral Component Interconnect bus (e.g., PCI, PCI Express). In at least one embodiment, touch sensor 942 can include touch screen sensors, pressure sensors, or fingerprint sensors. In at least one embodiment, wireless transceiver 944 can be a Wi-Fi transceiver, a Bluetooth transceiver, or a mobile network transceiver such as a 3G, 4G, or Long Term Evolution (LTE) transceiver. In at least one embodiment, firmware interface 946 enables communication with system firmware and can be, for example, a unified extensible firmware interface (UEFI). In at least one embodiment, the network controller 948 can enable a network connection to a wired network. In at least one embodiment, a high-performance network controller (not illustrated) couples with interface bus 912. In at least one embodiment, audio controller 950 can be a multi-channel high-definition audio controller. In at least one embodiment, the processing system 900 includes an optional legacy I/O controller 952 for coupling legacy (e.g., Personal System 2 (PS/2)) devices to the processing system 900. In at least one embodiment, the platform controller hub 914 can also connect to one or more Universal Serial Bus (USB) controllers, such as USB controller 960 to connect input devices, such as a keyboard and mouse combination (keyboard/mouse 962), a camera 964, or other USB input devices.

In at least one embodiment, an instance of memory controller 910 and platform controller hub 914 can be integrated into a discreet external graphics processor, such as external processor 938. In at least one embodiment, the platform controller hub 914 and/or memory controller 910 can be external to one or more processors 906. For example, in at least one embodiment, the processing system 900 can include an external memory controller (e.g., memory controller 910) and the platform controller hub 914, which can be configured as a memory controller hub and peripheral controller hub within a system chipset that is in communication with the processors 906.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of a set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain at least one embodiment require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium stores instructions, and a main central processing unit (CPU) executes some of the instructions while a graphics processing unit (GPU) executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout specification terms such as "processing," "computing," "calculating," "determining," or like, refer to action and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes for carrying out instructions in sequence or in parallel, continuously, or intermittently. The terms "system" and "method" are used herein interchangeably insofar as a system may embody one or more methods, and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures may be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   determining, using a computing device, an expected power consumption value for a set of processes that are scheduled to be performed by a server of a server rack of a plurality of server racks;
   determining an available rack power capacity for one or more server racks of the plurality of server racks;
   selecting, from the one or more server racks, a first server rack having a highest available rack power capacity, the first server rack comprising a first set of servers;
   determining whether a first server of the first set of servers is available; and
   responsive to determining the first server is available, assigning the set of processes to the first server.

2. The method of claim 1, wherein determining, for the one or more server racks of the plurality of server racks, the available rack power capacity comprises:
   obtaining a real-time rack power usage value for at least one server rack of the one or more server racks; and
   subtracting the real-time rack power usage value from a maximum available rack power value, wherein the maximum available rack power value is based on a load factor ratio of a maximum rack power value.

3. The method of claim 1, wherein determining whether the first server is available comprises:
   determining whether the first server has available compute resources; and
   determining whether the first server has an available power capacity.

4. The method of claim 3, wherein the available compute resources of the first server are based on usage metrics of hardware components of the first server, wherein determining the expected power consumption value comprises:
   determining a duration for performing the set of processes; and
   predicting, based on the duration and the usage metrics of the hardware components of the first server, the expected power consumption value.

5. The method of claim 3, wherein determining whether the first server has the available power capacity comprises:
   obtaining a real-time power usage value for the first server;
   determining whether a first sum of the real-time power usage value and the expected power consumption value exceeds a maximum power value associated with the first server; and
   responsive to determining the first sum does not exceed the maximum power value, indicating that the first server has the available power capacity.

6. The method of claim 1, further comprising:
responsive to determining the first server is not available, determining whether a second server of the set of servers is available; and
responsive to determining the second server is available, assigning the set of processes to the second server.

7. The method of claim 1, further comprising:
responsive to determining the first server is not available, selecting, from the one or more server racks, a second server rack having a second-highest available rack power capacity, the second server rack comprising a second set of servers; and
determining whether a third server of the second set of servers is available; and
responsive to determining the third server is available, assigning the set of processes to the third server.

8. The method of claim 1, wherein determining the expected power consumption value comprises:
determining if the set of processes have previously been performed;
responsive to determining the set of processes have previously been performed, obtaining from a data store, one or more historical power consumption values for the set of processes; and
predicting the expected power consumption value based on the one or more historical power consumption values.

9. The method of claim 8, wherein predicting the expected power consumption value comprises:
determining using a machine learning (ML) model, the expected power consumption value, wherein the ML model is updated using at least of the one or more historical power consumption values.

10. The method of claim 9, wherein the ML model is at least one of a random forest regression model or a support vector machine (SVM) model.

11. A computing device comprising:
one or more processing units to determine an expected power consumption value for a set of processes that are scheduled to be performed, determine an available rack power capacity for one or more server racks of a plurality of server racks, select from the one or more server racks, a first server rack having a highest available rack power capacity, the first server rack comprising a first set of servers, and responsive to determining a first server of the first set of servers is available, assign the set of processes to the first server.

12. The computing device of claim 11, wherein to determine an available rack power capacity for at least one server rack of the one or more server racks, the one or more processing units are to:
obtain a real-time rack power usage values for the at least one server rack; and
subtract the real-time rack power usage value from a maximum available rack power value, wherein the maximum available rack power value is based on a load factor ratio of a maximum rack power value.

13. The computing device of claim 11, wherein to determine whether the first server is available, the one or more processing units are to:
determine whether the first server has available compute resources; and
determine whether the first server has an available power capacity.

14. The computing device of claim 13, wherein the available compute resources of the first server are based on usage metrics of hardware components of the first server, wherein to determine the expected power consumption value, the one or more processing units are to:
determine a duration to perform the set of processes; and
predict, based on the duration and the usage metrics of the hardware components of the first server, the expected power consumption value.

15. The computing device of claim 13, wherein to determine whether the first server has the available power capacity, the one or more processing units are to:
obtain a real-time server power usage value for the first server;
determine whether a first sum of the real-time server power usage value and the expected power consumption value exceeds a maximum power value associated with the first server; and
responsive to determining the first sum does not exceed the maximum power value, indicate that the first server has available power capacity.

16. A system comprising:
a memory device; and
a processing device coupled to the memory device, wherein the processing device is to:
determine an expected power consumption value for a set of processes that are schedule to be performed by a server of a server rack of a plurality of server racks;
determine an available power capacity for one or more server racks of the plurality of server racks;
select, from the one or more server racks, a first server rack having a highest available rack power capacity, wherein the first server rack comprises a first set of servers;
determine whether a first server of the first set of servers is available; and
responsive to determining the first server is available, assign the set of processes to the first server.

17. The system of claim 16 wherein to determine the expected power consumption value, the processing device is to:
determine if the set of processes have previously been performed;
responsive to determining the set of processes have previously been performed, obtain from a data store, one or more historical power consumption values for the set of processes; and
predict the expected power consumption value based on the one or more historical power consumption values.

18. The system of claim 17, wherein to predict the expected power consumption value, the processing device is to:
determine using a machine learning (ML) model, the expected power consumption value, wherein the ML model is updated using at least one of the one or more historical power consumption values.

19. The system of claim 18, wherein the ML model is at least one of a random forest regression model or a support vector machine (SVM) model.

20. The system of claim 16, wherein the system comprises one or more of:
a control system for an autonomous or semi-autonomous machine;
a perception system for an autonomous or semi-autonomous machine;
a system for performing simulation operations;
a system for performing deep learning operations;
a system for generating synthetic data;
a system for generating multi-dimensional assets using a collaborative content platform;

a system implemented using an edge device;
a system implemented using a robot;
a system incorporating one or more virtual machines (VMs);
a system implemented at least partially in a data center; or
a system implemented at least partially using cloud computing resources.

\* \* \* \* \*